United States Patent [19]
Zepeda et al.

[11] Patent Number: 5,738,454
[45] Date of Patent: Apr. 14, 1998

[54] MULTIPLE-FUNCTION PRINTER WITH COMMON OUTPUT PATH MECHANISM WITH FLOATING GUIDE RIBS TO ACCOMMODATE MEDIA AND DOCUMENTS OF DIFFERENT THICKNESS

[75] Inventors: Caroline M. Zepeda, San Marcos; Samuel A. Stodder, Encinitas, both of Calif.

[73] Assignee: Hewlett-Packard Company, Palo Alto, Calif.

[21] Appl. No.: 724,642

[22] Filed: Oct. 1, 1996

Related U.S. Application Data

[63] Continuation-in-part of Ser. No. 585,058, Jan. 11, 1996, Pat. No. 5,651,623, which is a continuation-in-part of Ser. No. 145,355, Oct. 29, 1993, abandoned.

[51] Int. Cl.$^6$ ................................................ B41J 13/036
[52] U.S. Cl. ..................... 400/625; 400/638; 347/215; 271/314
[58] Field of Search ....................... 400/625, 636, 400/637, 637.2, 637.3, 637.4, 638, 639.1, 641, 624; 271/188, 314, 315; 347/215

[56] References Cited

U.S. PATENT DOCUMENTS

| | | | |
|---|---|---|---|
| 4,511,904 | 4/1985 | Takahashi | 346/134 |
| 4,657,420 | 4/1987 | Kondo | 400/625 |
| 4,688,957 | 8/1987 | Prevignano | 400/625 |
| 4,729,683 | 3/1988 | Staniszewski | 400/624 |
| 4,802,778 | 2/1989 | Takahashi et al. | 400/624 |
| 4,997,179 | 3/1991 | Mizutani et al. | 400/625 |
| 5,124,800 | 6/1992 | Hashimoto | 358/296 |
| 5,141,344 | 8/1992 | Murakami et al. | 271/314 |
| 5,162,916 | 11/1992 | Stemmle et al. | 358/296 |
| 5,215,394 | 6/1993 | Kim | 400/641 |
| 5,558,451 | 9/1996 | Hanabusa et al. | 400/637 |

FOREIGN PATENT DOCUMENTS

| | | | |
|---|---|---|---|
| 4135308 | 4/1992 | Germany | 400/625 |
| 0188376 | 7/1989 | Japan | 400/625 |

*Primary Examiner*—Christopher A. Bennett

[57] ABSTRACT

A common printer platen for conveying printed media and documents to a printer exit includes an exit mechanism having a series of floating spaced guide ribs to accommodate printed media or documents of a first range of thickness and printed media or documents of a second range of greater thickness. An exit chassis includes a longitudinal first edge, a series of spaced guide ribs including an integral beam forming a star wheel carrier is pivotably mounted transversely to the chassis first edge, and spring members extend between the chassis and the beams for accommodating printed media or documents of a greater thickness conveyed through a nip formed by the star wheels and a printer roller.

15 Claims, 21 Drawing Sheets

MULTIPLE-FUNCTION PRINTER WITH COMMON OUTPUT PATH MECHANISM WITH FLOATING GUIDE RIBS TO ACCOMMODATE MEDIA AND DOCUMENTS OF DIFFERENT THICKNESS

This application is a continuation-in-part of application Ser. No. 08/585,058, filed Jan. 11, 1996, now U.S. Pat. No. 5,651,623 issued Jul. 29, 1997 which is a continuation-in-part of application Ser. No. 08/145,355, filed Oct. 29, 1993, now abandoned.

RELATED APPLICATION

This application relates to U.S. Ser. No. 08/144,943 filed Oct. 29, 1993 by Samuel A. Stodder, now U.S. Pat. No. 5,391,009 issued Feb. 21, 1995 and U.S. Ser. No. 08/724,297 filed Sep. 19, 1996 by Gaarder, Stodder et al. and U.S. Ser. No. 08/724,296 filed Sep. 19, 1996 by Wilcox and Stodder, all having a common assignee to this application, the disclosures of which are incorporated herein by reference.

BACKGROUND OF THE INVENTION

This invention relates generally to printers and facsimile devices, and more particularly to printers and facsimile devices and their operation which are combined together to form a multiple-function product.

Facsimile devices (i.e., fax machines) have been used for many years to transmit documents containing text or graphical images through a modem via telephone lines through another modem to a remote destination. In its basic form, a conventional fax machine is used for three separate functions: sending a first document; receiving a second document; and producing a hardcopy printout of the second document. Of course the hardcopy printout is not the actual second document but rather a close facsimile thereof. Thus, sending the contents of the second document via fax avoids going to the trouble, expense and delay of actually delivering the second document to a remote destination.

An enhanced fax machine can also be used to perform two additional functions: producing a hardcopy printout of the first document; and producing a hardcopy printout of a cumulative report showing an itemized listing of date, time, and destination for first documents sent from the fax machine.

It is therefore apparent that a fax machine acts primarily as both a sender (i.e., scanning and transmitting) and receiver of documents, and that the fax machine also acts secondarily as a printer (i.e., printing a facsimile of a second document, printing a copy of a scanned first document, or printing an itemized report) and secondarily as a convenience copier (i.e., scanning/printing a first document).

Both the basic fax machine and the enhanced fax machine just described have used two separate paper paths. One path is dedicated to the first document and typically includes document feeder tray, document paper pick/paper drive system, document scanning station, and document output. Another path is dedicated to the printout (originally roll-fed, now sheet-fed) and typically includes sheet feeder tray, sheet paper pick/sheet drive system, sheet printing station, and sheet output. As a result, a fax machine is a bulky, expensive multiple-function device which requires a large number of parts for duplicate paper handling functions.

One of the problems in prior art multiple function printers has been the inability to simply and inexpensively provide for the movement of both printed media, such as a relatively thin paper sheet which has been printed on or scanned through a single outpath path, and a movement of thicker document, such as a photograph with a plastic carrier, through the same output path without jamming. Therefore, this problem has been solved by having dual paper paths, one for documents and one for printed media, with attendant disadvantages of increased cost and increased footprint.

BRIEF SUMMARY OF THE INVENTION

It is an object of the present invention to provide a fax machine with common feeder/output mechanisms for documents passing through a scanning printing station and for sheets passing through a printing station.

Another important object is to provide a multiple-function printer/fax machine which is primarily a printer peripheral for a computer as well as primarily a fax machine, having integrated shared paper path and common mechanisms for scanning documents on the one hand and for producing hardcopy printout sheets on the other hand.

Still another object is to provide a multiple-function printer/fax machine with a pressure plate feeder scheme which will enable fast reliable automatic feeding of a large stack of documents up to about twenty-five pages as well as a large stack of printout sheets up to about one hundred pages. A related object is to provide dual feeder paths into a common paper pick, with self-actuating shifting means for automatically changing from a printing mode to a scanning mode whenever a document is placed in an automatic document feeder tray.

A further object is to provide a multiple function machine having a single drive motor for picking individual pages from a stack and for moving individual pages past each processing station such as a scanning station and/or a printing station. A related object is to provide gear means from the single drive motor for driving a primary drive roller, a paper pick roller, and an output roller at different rates, and for moving a feeder pressure plate to and fro between positions of engagement and disengagement.

An additional object is to provide the aforementioned multiple function machine with a self-actuating delay mechanism for spacing apart individual pages which are sequentially picked from a document stack or a printout sheet stack.

In one embodiment of the invention, the common document/sheet path and shared mechanisms include a pressure plate, pick roller assembly, drive roller system, and drive motor wherein documents proceed actively through a scanner station and passively through a printer station and printout sheets proceed passively through the scanner station and actively through the printer station, both to a common output. In one alternate embodiment of the invention, the common document/sheet path and shared mechanisms include a drive roller system and output, wherein documents proceed actively through a scanner station and passively through a printer station and printout sheets bypass the scanner station and proceed actively through the printer station, both to a common output. In another alternate embodiment of the invention, the common document/sheet path and shared mechanisms include a common path through a main drive roller system, a combined scanner/printer station and output, with separate pick rollers and separate pressure plates driven by the drive motor for the main drive roller system.

When using a common paper path for scanning and printing, media that feeds through the device can range from original sheet stock to highly curled, bent or otherwise deformed documents. Provisions are made in this invention to properly move the media from roller to roller without incurring paper jams. Sheet media for printing is typically in good form and does not always require a paper path constraint on both faces of the paper. For a translating carriage type printer (i.e. typical inkjet printer), the space above the paper in the printing region is used for moving the print cartridge across the paper in close proximity. Documents for scanning can be in bad form and have been found to require top and bottom face constraint throughout the paper path. Thus, this invention includes a means to constrain both faces of documents which pass through the print region and when printing on original sheet stock does not interfere with the print cartridge.

This improvement includes floating guide ribs which coupled with conical wheels in a common paper path exit mechanism that forces printed media to be driven out in a conical shape at an outward angle for wet stacking, as well as to allow relatively thicker documents to be driven out of the printer in the same paper path. The floating guide ribs which are pivotable with respect to an exit chassis provides a vertical constraint on the wet printed media as the media exits from a row of star wheels onto the conical wheels (often times called "tires"). These ribs, in conjunction with the conical wheels, forces the wet media to exit into a conical shape and at an upward angle. This prevents the exiting sheet from smearing into the drying media sitting in the output tray. These ribs, because they are floating, also allow thick documents to exit out of this path. A thick document can push the ribs upward and be allowed to exit at a smaller angle and with less of a cone shape. If a thick document were not allowed to do this (like a photograph inside a carrier sheet), there would not be enough energy provided to exit the document into the output tray. In experimental work by the inventors hereto it was found that a thick document required much more energy than a sheet of plain paper to bend the required amount that was needed to travel under fixed ribs and then up over conical wheels. Thus the floating guide rib was conceived and developed.

This improvement is used in conjunction with a document guide located above the paper path in the printing area which guides the document into the output roller nip. The document guides allows for deformed documents to be reliably moved through a common paper path multi-function printer. This results in a lower cost multi-function printer without compromising the reliability of the document feeding function.

Particularly, the present invention includes a common printer platen for conveying printed media and documents to a printer exit and a series of spaced guide ribs extending from the platen and wherein the guide ribs are floating relative to the platen to accommodate printed media of a first range of thickness and documents of a second range of greater thickness.

In a preferred embodiment, the printer exit mechanism includes an exit chassis, the chassis including a longitudinal first edge, a series of spaced guide ribs including an integral beam forming a star wheel carrier pivotably mounted adjacent to the chassis first edge, a series of equally spaced stops extending from the chassis and spring members extending between the chassis and the beams for urging the beams against the stops, whereby printed media of one thickness and documents of a greater thickness conveyed past the beams are accommodated by pivoted movement of the beams away from the stops.

DETAILED DESCRIPTION OF THE PREFERRED EMBODIMENTS

Generally speaking, the invention provides for picking pages from a stack of sheets in an input feeder for roller-driven movement along a first path through a printing station to an output, and for picking pages from a stack of documents in an input feeder for roller-driven movement along a second path through a scanning station to an output. Depending on the particular implementation, at least a portion of the first and second paths are commonly shared, and common mechanisms are used for various steps such as for picking, providing roller-driven movement through the processing stations, and for actuating a pressure plate in the input feeders.

Figure 1:
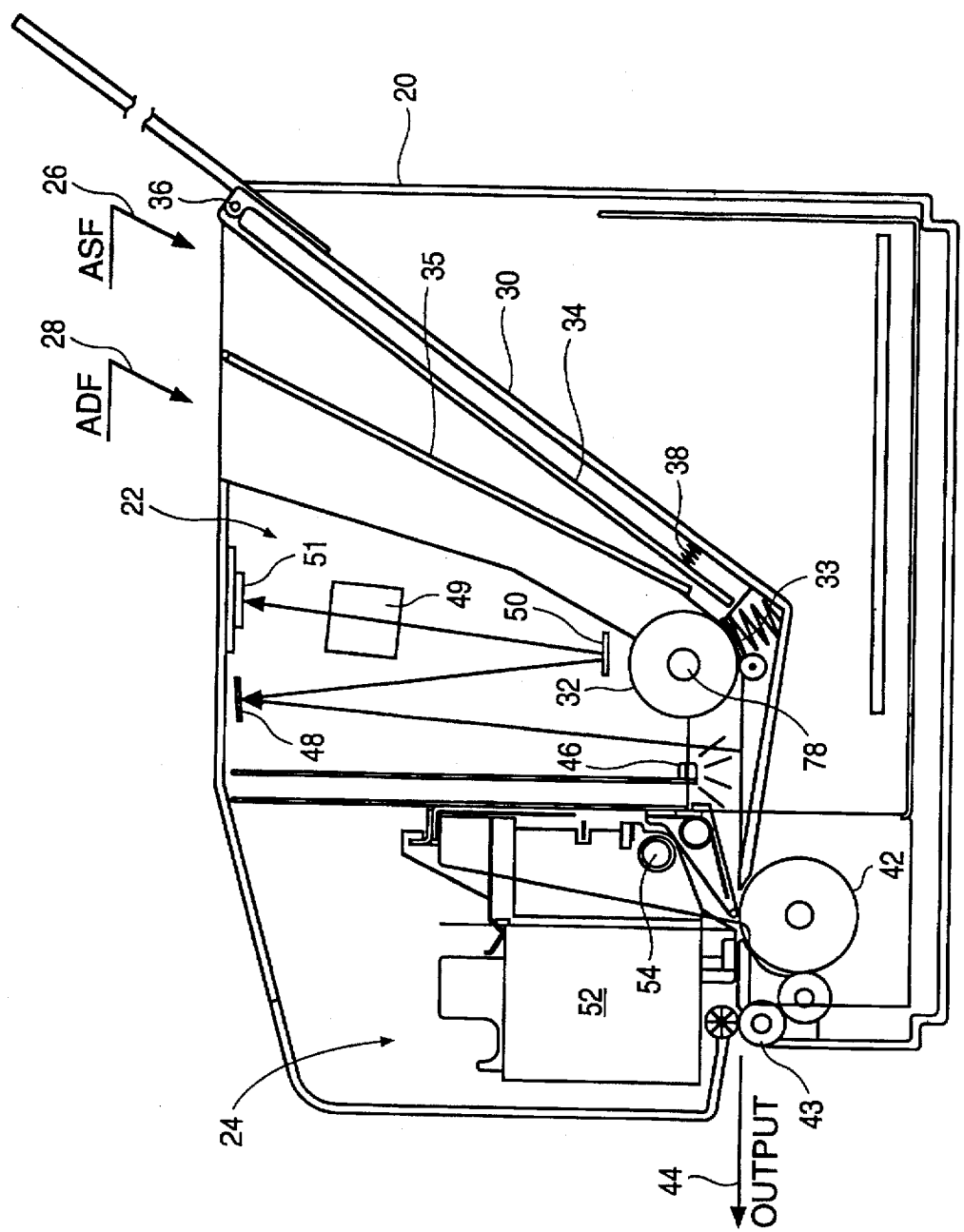
FIG. 1 is a schematic side view of a presently preferred printer/facsimile embodiment of the present invention.
Figure 2:
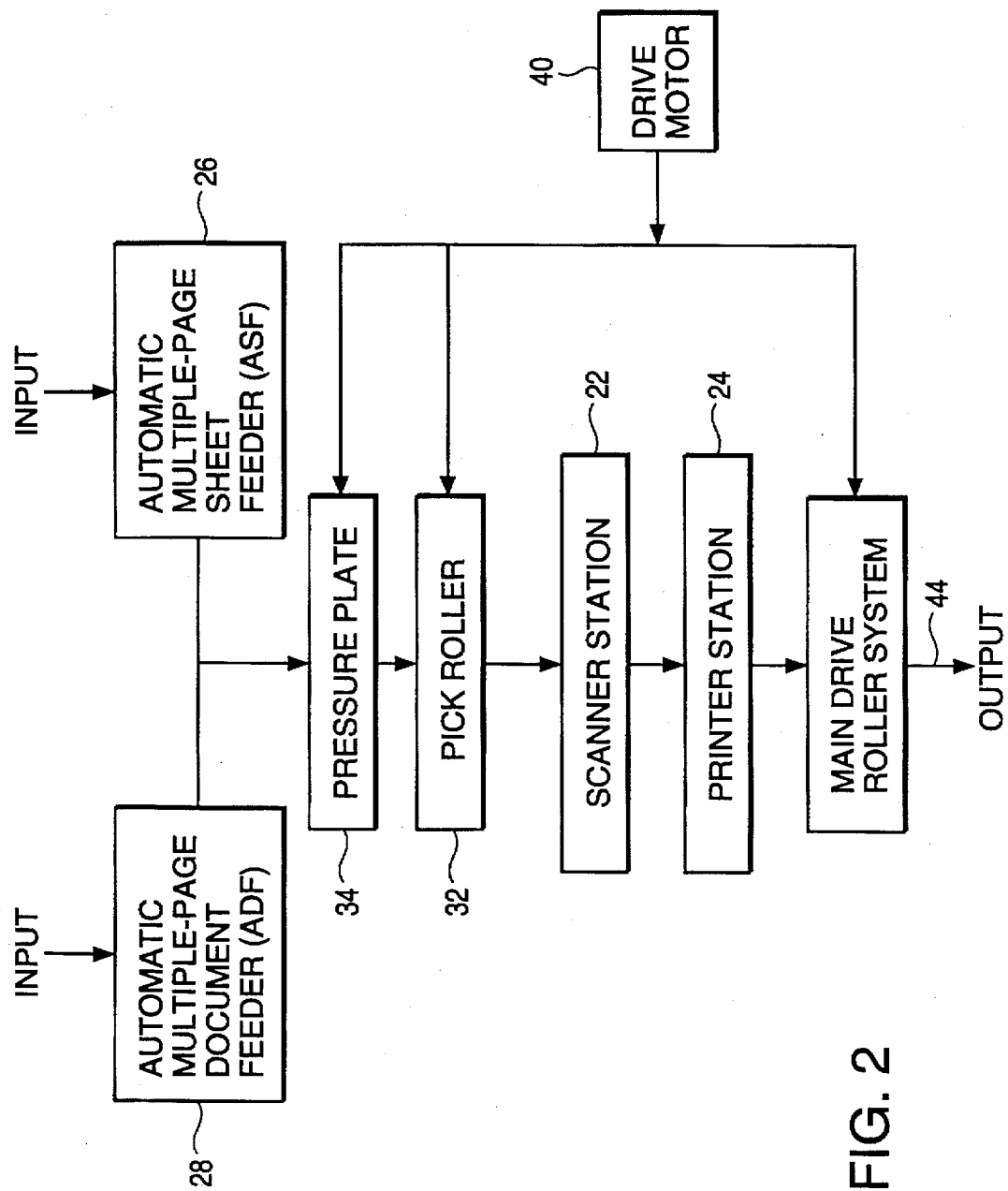
FIG. 2 is a functional block diagram of the embodiment of FIG. 1.
Figure 8:
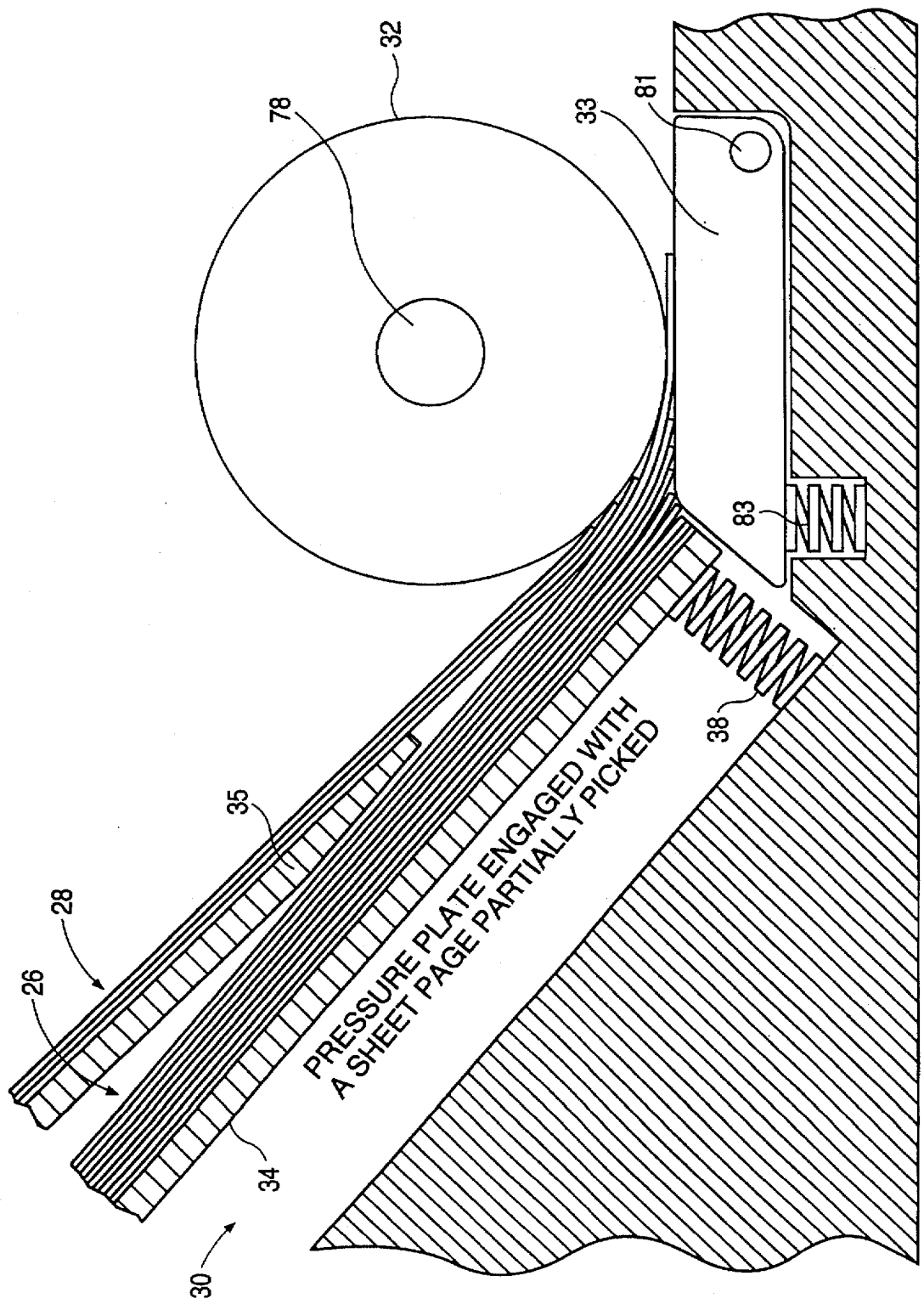
FIG. 8 is a close-up schematic showing a pick roller ready to begin a reverse rotation kicking partially picked sheet(s) backward into the ASF as a result of a document stack being inserted into the ADF.
Figure 9:
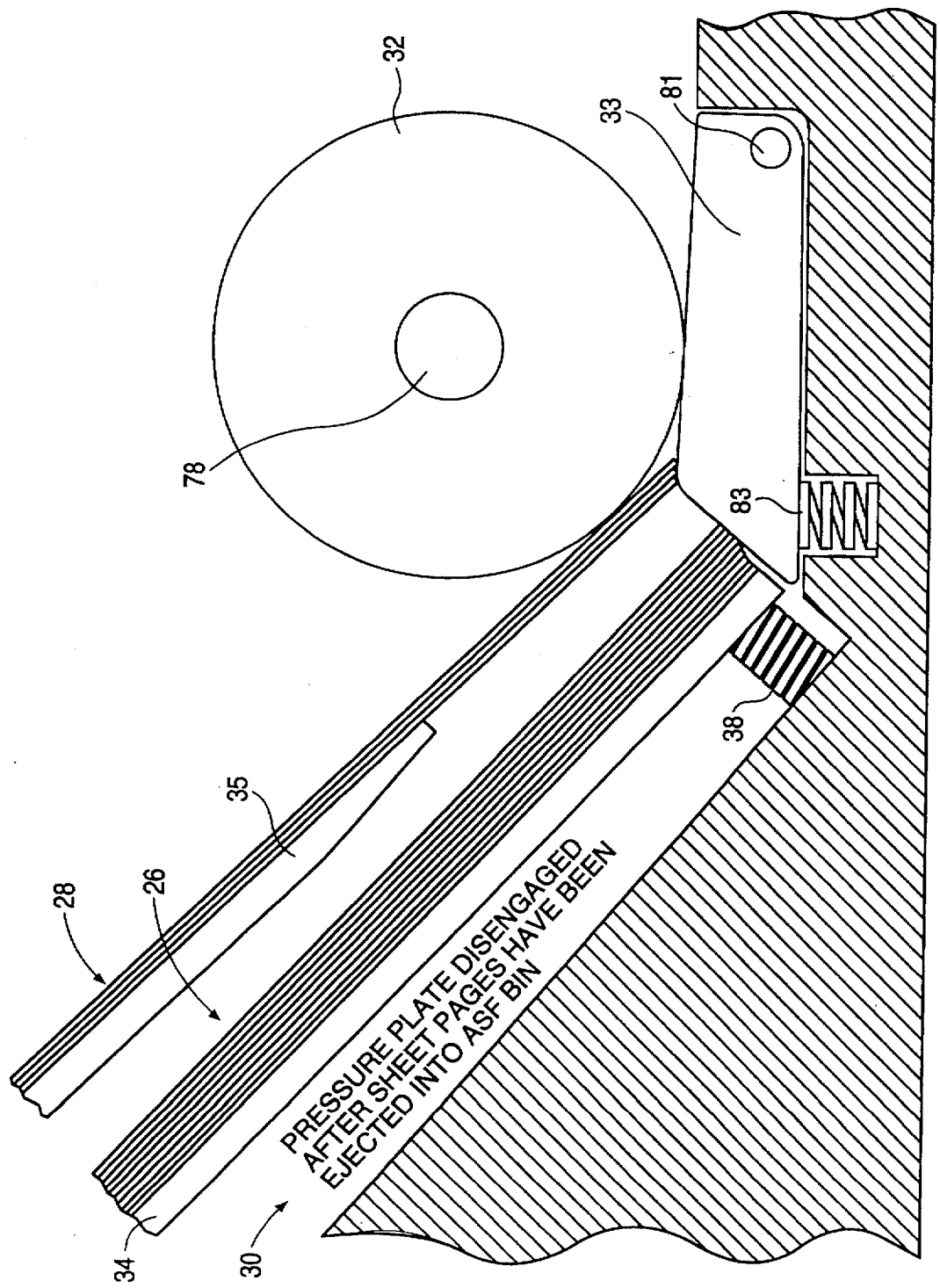
FIG. 9 is a close-up schematic showing the pressure plate in disengaged position and all of the partially picked sheets expelled from underneath the pick roller into the ASF.
Figure 10:
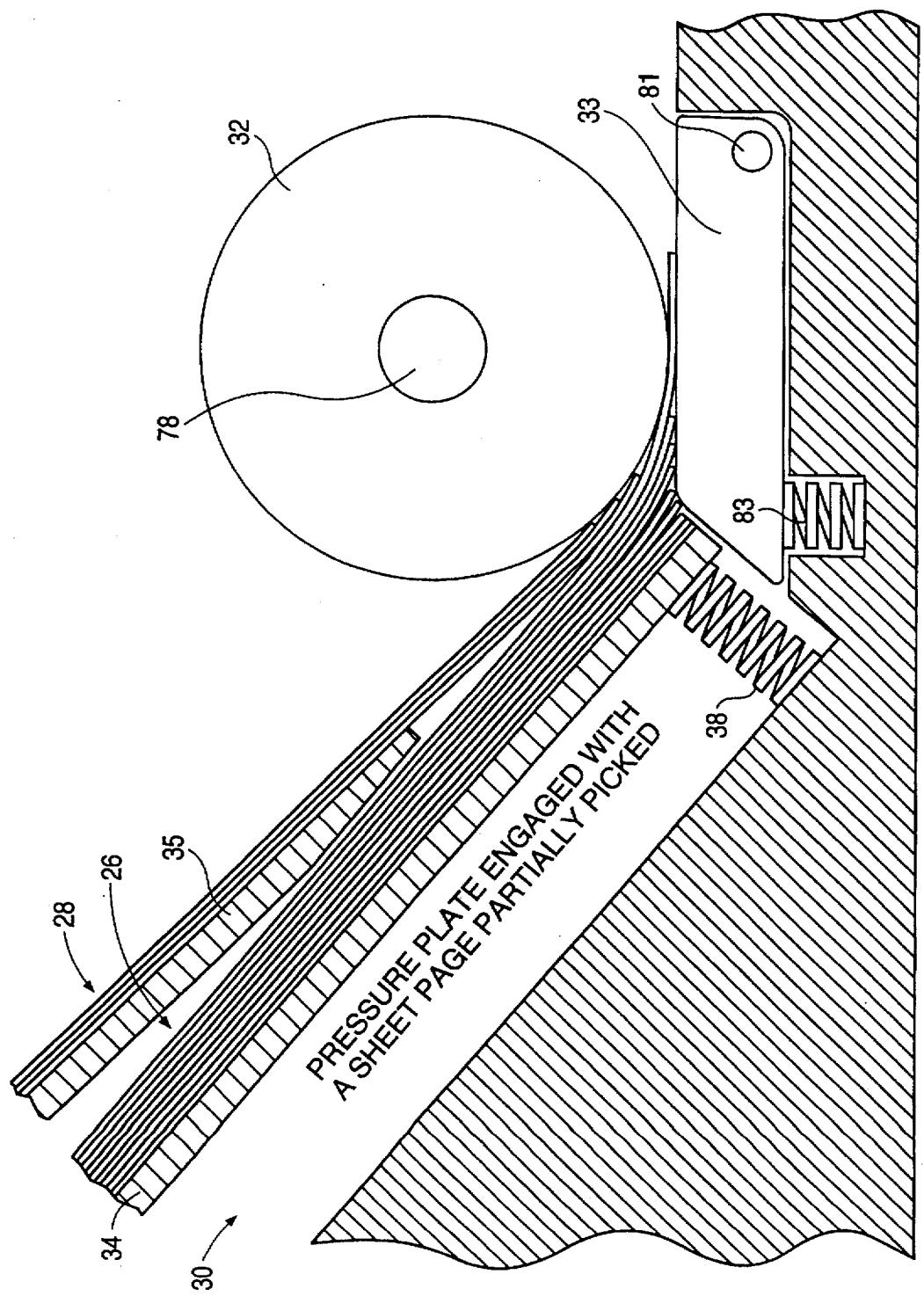
FIG. 10 is a close-up schematic showing the pressure plate returned to an engaged position with the pick roller already commencing to pick a page from the top of the stack of documents which now partially overly the stack of print sheets.

Referring more particularly to FIGS. 1-2, the multiple-function device of the presently preferred embodiment includes a frame 20 for housing a scanner station 22 and a printer station 24. A stack of print sheets is loadable into an automatic sheet feeder (ASF) 26, and a stack of documents having text/graphics to be scanned is loadable into an automatic document feeder (ADF) 28 which together form a common input feeder slot 30 having a pick roller 32 and a spring-loaded stripper pad 33 at the lower end. The upper portion of the input feeder slot which constitutes the ADF is separated from the ASF by a divider 35. The divider is truncated at its lower end to allow document stacks and sheets stacks to converge at the pick roller (see FIGS. 8-10). A pressure plate 34 is attached at its upper end through pivot pin 36 to the frame and is normally biased upwardly against the pick roller by springs 38. A drive motor 40 is connected through a gear mechanism to the pressure plate 34 and pick roller 32 as described in more detail hereinafter, and is also connected to a main drive roller 42 which pulls the pages through the processing stations for either scanning or printing. The printout pages as well as the scanned pages pass across an output roller 43 to be deposited in a common output area 44.

The scanner and printer stations in the drawings are for purposes of illustration only and are of conventional design, except for their unique locations along a shared path using shared mechanisms. In that regard, scanner station 22 includes a lamp 46 for illuminating a scanning zone, reflective mirrors 48, 50, a lens 49, and a CCD (charge-coupled device) photosensor 51. Printer station 24 includes inkjet cartridge 52 which rides on a slider rod 54 back and forth across a print zone.

Figure 11:
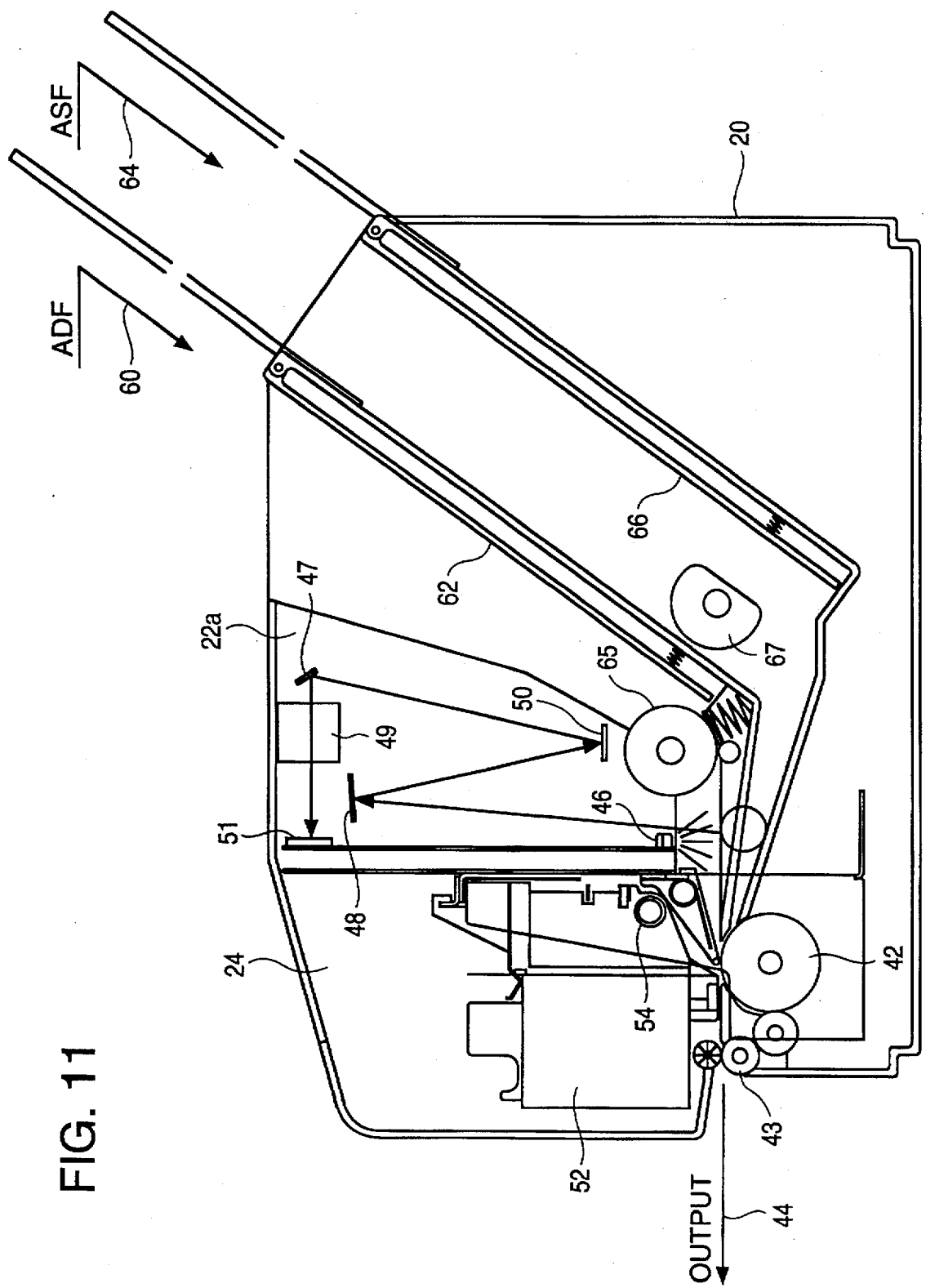
FIG. 11 is a schematic side view of an alternate printer/facsimile embodiment of the present invention.
Figure 12:
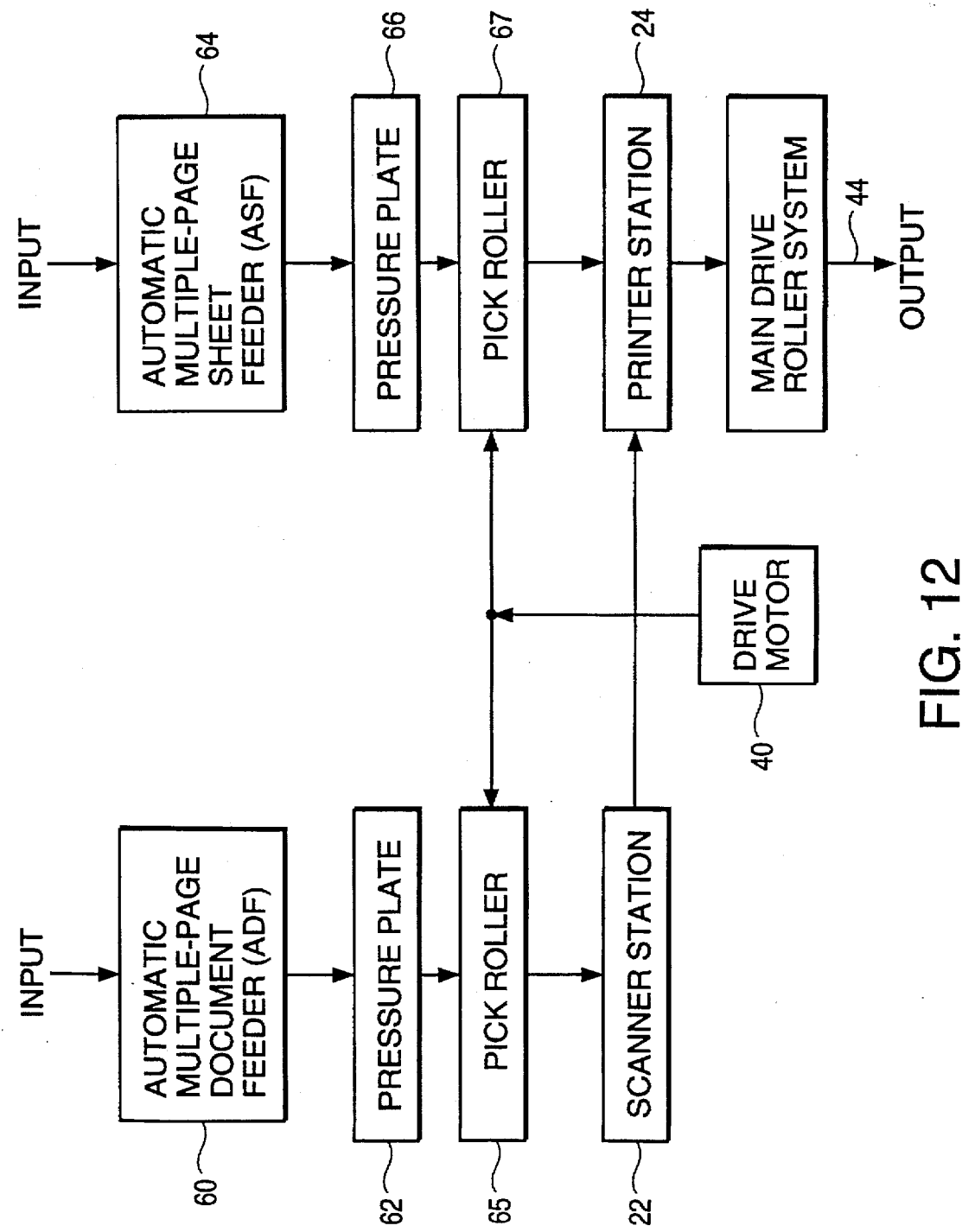
FIG. 12 is a functional block diagram of the embodiment of FIG. 11.

In the alternate embodiment of FIGS. 11-12, the common document/sheet path and shared mechanisms are similar to FIGS. 1-2 and include scanner station 22a, printer station 24, drive motor 40, main drive roller 42, output roller 43 and a shared output 44 wherein document pages proceed actively through the scanner station and passively through the printer station, and printout sheet pages bypass the scanner station and proceed actively through the printer station, both to a common output. However, ADF 60 has its own pivotally mounted spring-loaded pressure plate 62 to facilitate reliable page feeding to document pick roller 63, and ASF 64 has its own pivotally mounted spring-loaded pressure plate 66 to facilitate reliable page feeding to sheet pick roller 67, with both pick rollers 65, 67 being driven by the drive motor 40.

Figure 13:
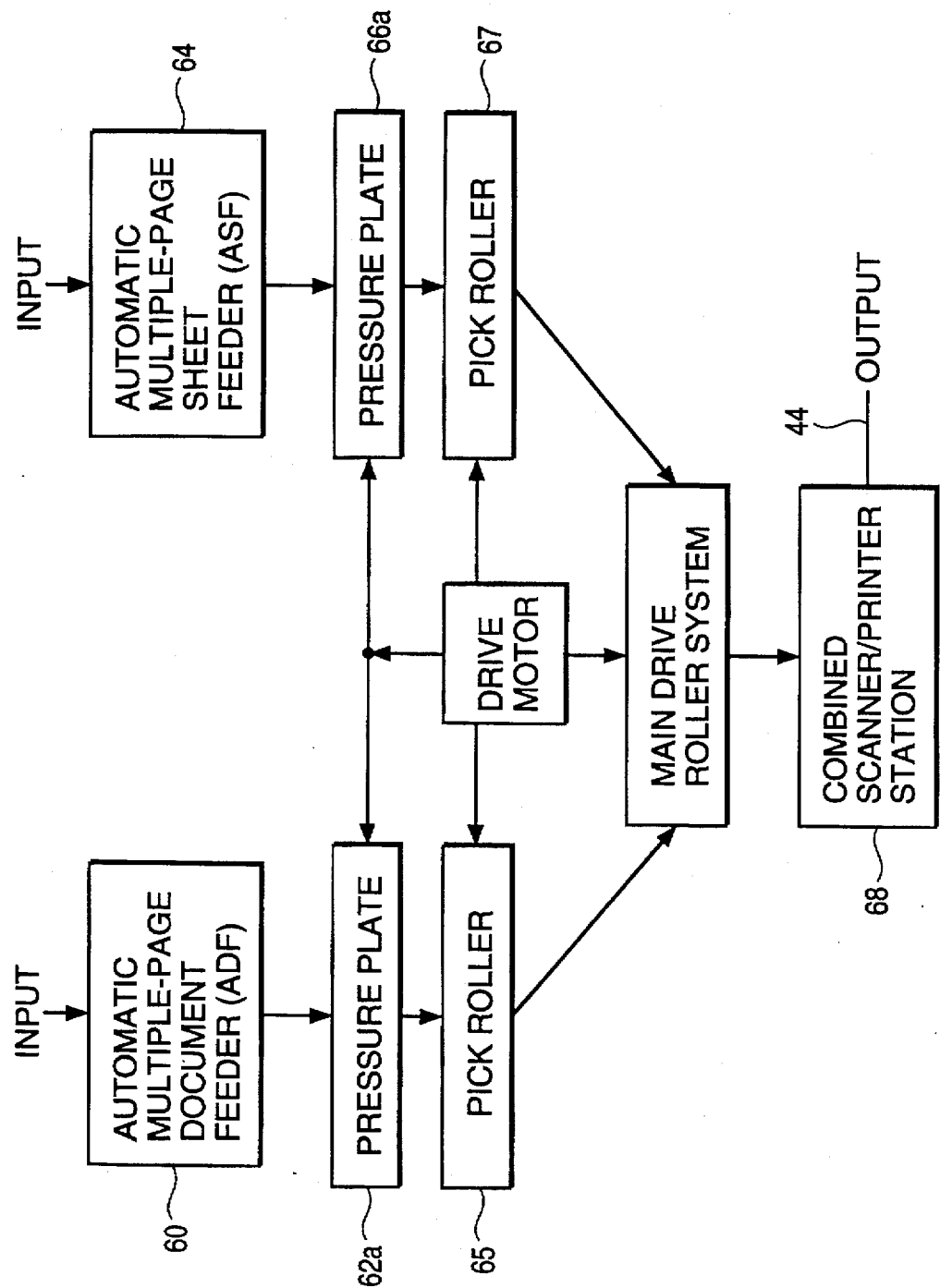
FIG. 13 is a functional block diagram of another alternate printer/facsimile embodiment of the present invention.

In another alternate embodiment of FIG. 13, the common document/sheet path and shared mechanisms are similar to FIGS. 11-12. But this alternate embodiment provides a common path through a combined scanner/printer station 68 to a common output 44, with separate pick rollers 65, 67 and separate pressure plates 62a, 66a driven by the drive motor 40 for the main drive roller system.

Referring now to FIGS. 3-6 which show further details of the preferred embodiment of FIGS. 1-2, the input feeder slot is integrated into the device so that when the unit is resting with its feet 69 on a desk top, stacks of sheets or documents can be added without having to remove any tray. Since the frame is supported by legs 71 so that the input feeder slot is angled downwardly, both of the stacks naturally settle to the bottom of the slot so that the leading edges of pages on top of the stacks will impinge against the pick roller (see FIGS. 8-10). The action of the pressure plate against both stacks assures proper separation by the spring-loaded stripper pad 33 in combination with the rotation of the pick roller 32.

The ADF includes an extender 70 mounted on the upper end of the divider 35 which pivots forwardly out of the way when pages are added or removed from the ASF. The ASF is sandwiched between the ADF and the bottom of the feeder slot and includes its own extender 72 as well as a single adjustable guide 74 for maintaining the sheet stack in proper positioning for feeding into the pick roller.

It will be understood by those skilled in the art that proper feeding/picking of pages from a large quantity stack of virginal printing paper in the ASF is a somewhat easier task than proper feeding/picking of variously sized partially bent pages of stacked documents in the ADF having text/graphics thereon. Therefore the ADF is positioned above the ASF for better picking by the pick roller and easier access for accurate and proper loading between dual adjustable guides 76. The automatic action of the pressure plate 34 as described in more detail hereinafter also helps to assure proper feeding of pages from the ASF for printing or pages from the ADF for scanning.

The pick roller 32 is mounted on a pick shaft 78 which has a pair of guide rollers 80 also mounted thereon in the commonly shared paper path, as well as a double-pin delay coupler 81 mounted on the shaft end outside the frame. The guide rollers 80 and matching pinch rollers 82 help to hold the pages in proper position as they move past the pick roller to the scanning and printing stations.

Figure 3:
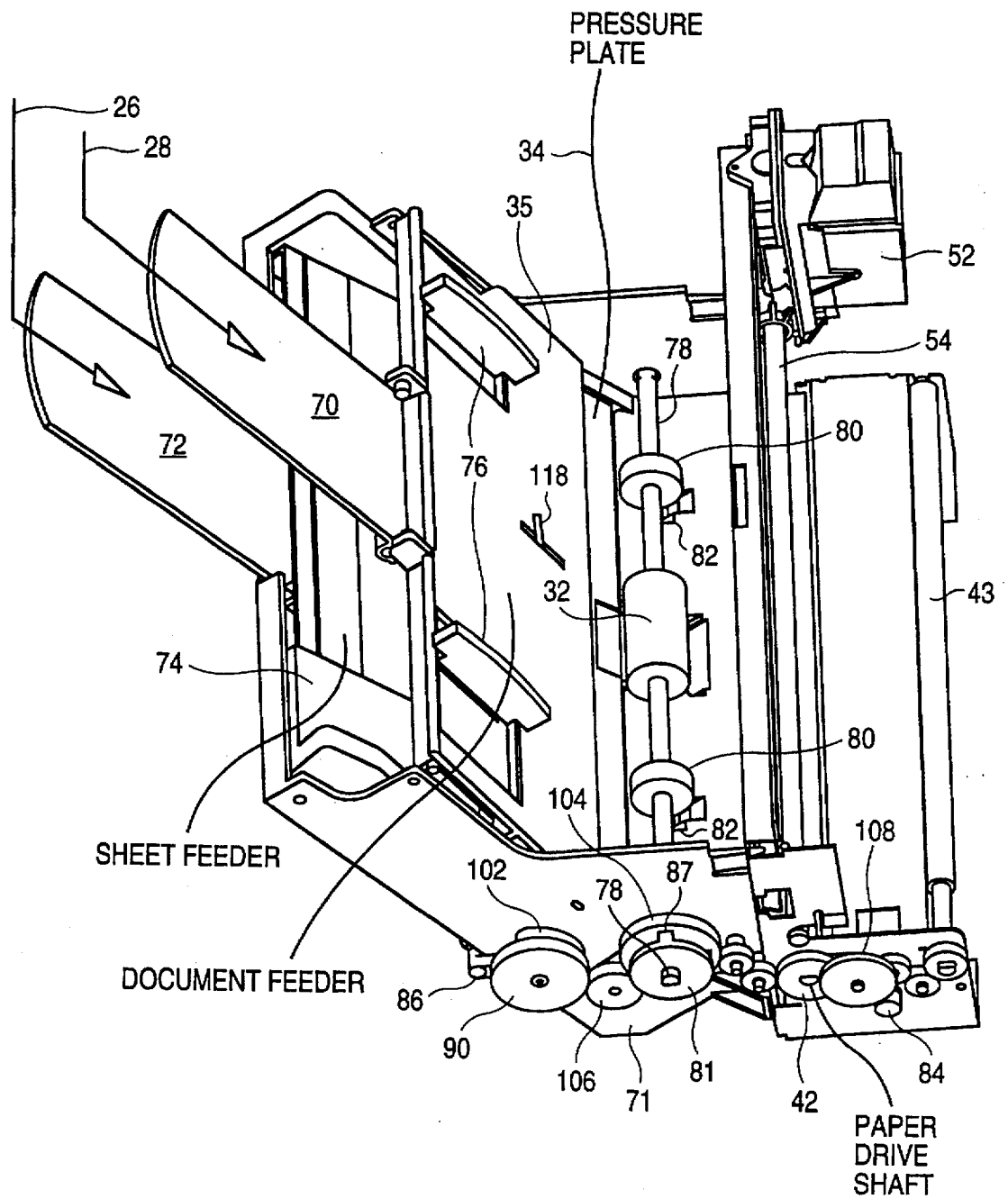
FIG. 3 is an isometric view looking down into an implementation of the embodiment of FIG. 1.
Figure 4:
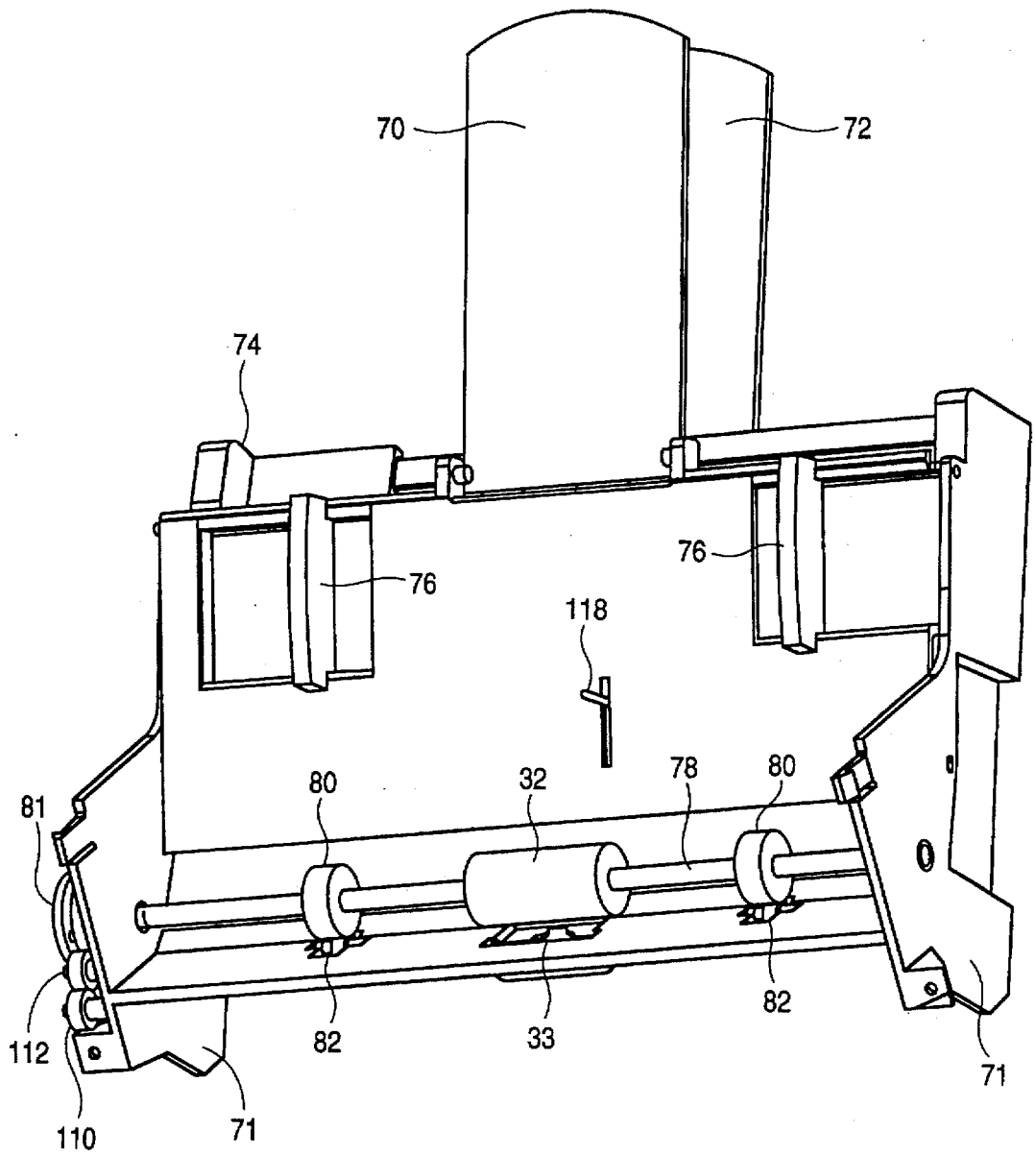
FIG. 4 is a fragmentary isometric view showing the input feeder slots and pick roller portion of FIG. 3.
Figure 5:
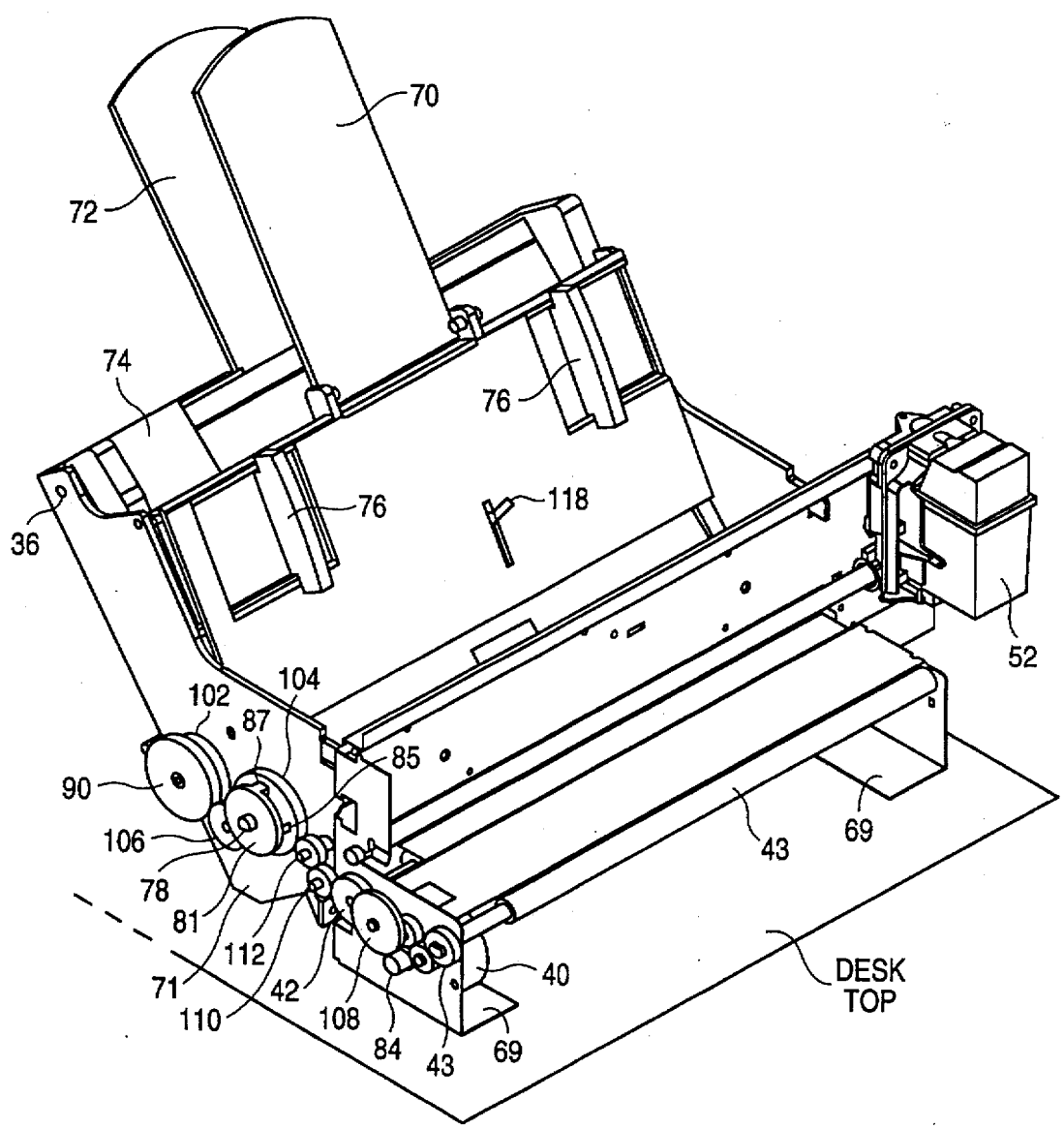
FIG. 5 is a front isometric view of FIG. 3.
Figure 6:
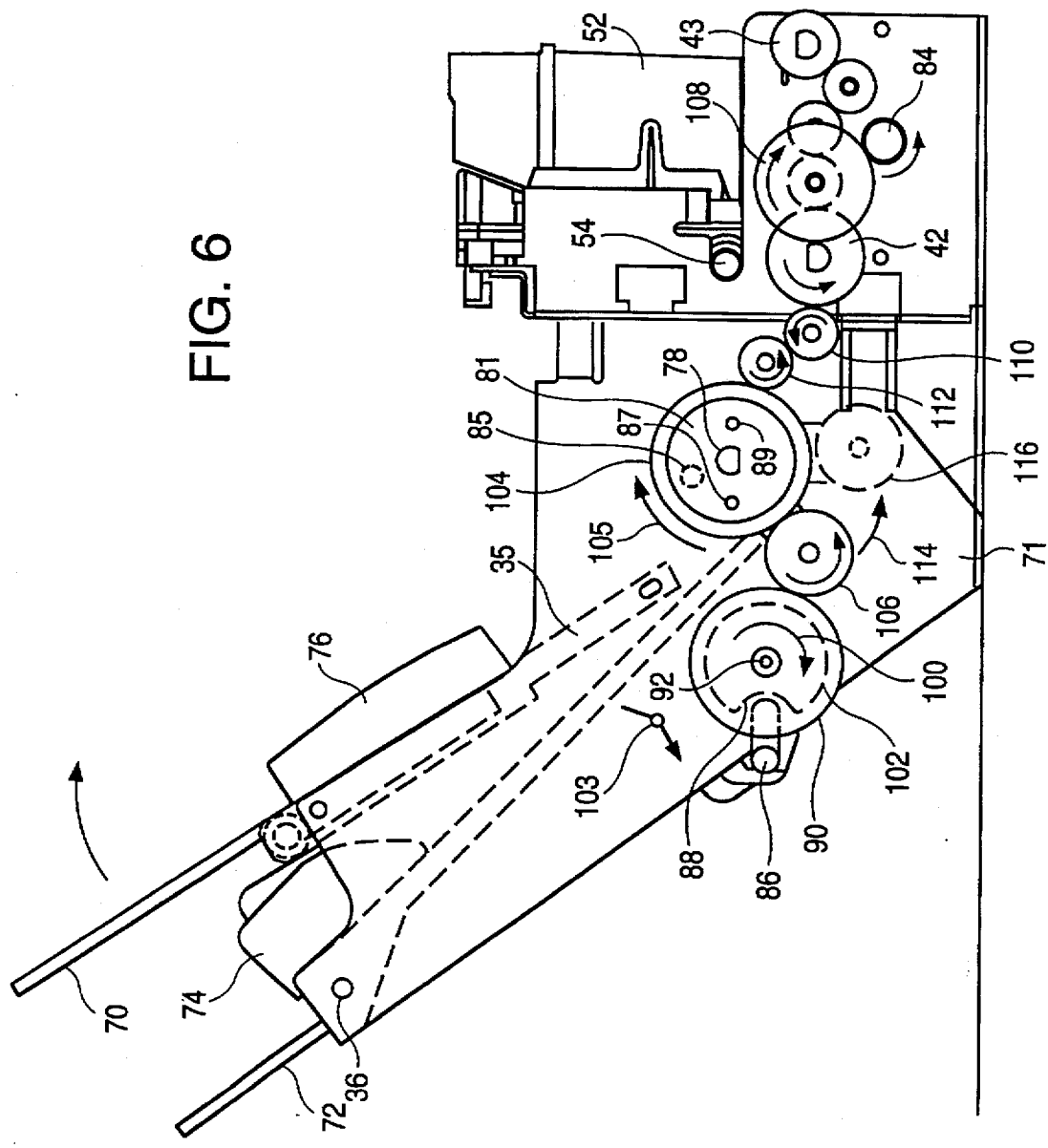
FIG. 6 is a side view of FIG. 3.
Figure 7:
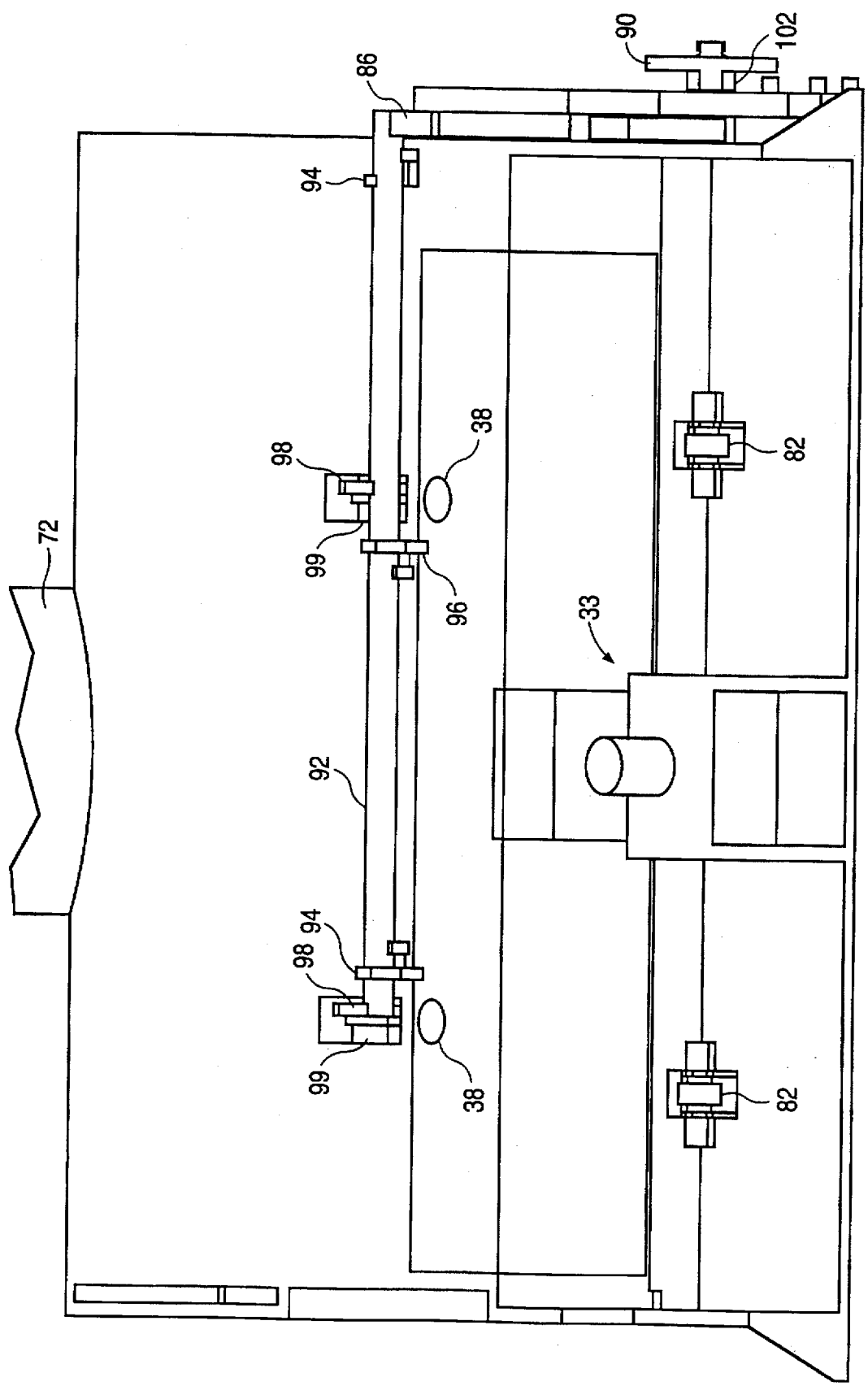
FIG. 7 is a fragmentary back view looking up at the feeder slots and pick roller portion of FIG. 4.

A unique gear mechanism is shown in FIGS. 3 and 6-7 for automatically moving the pressure plate to and fro between a disengaged position "open" position and an engaged "closed" position. The disengaged open position allows access to the stacks for removal, replenishment, or replacement of pages as well as for realignment of the stacks between one or more page picking events if that is deemed to be desirable and necessary to avoid mis-feeds. More importantly from a multiple-function point of view (see FIGS. 8-10), the disengaged open position allows new pages of documents to be placed in the ADF with their leading edges resting on top of the sheet stack in the ASF, thereby preparing for a scanning operation to commence.

The engaged closed position holds the sheet stack in aligned position together as a unit if there are not any documents in the ADF. This helps to prevent more than one page from being accidently picked. The engaged closed position holds the document stack in aligned position together as a unit if there are not any sheets in the ASF. If there is already a stack of sheets in the ASF and some additional document pages have been added to the ADF, then the engaged closed position holds both the document stack and the underlying sheet stack in aligned position together as a composite stack insofar as their leading edges are concerned.

FIG. 6 shows the gear mechanism in a "start disengagement" position, with motor drive gear 84 moving in reverse direction to cause main drive roller 42 to also go in reverse. Coupling pin 85 on linkage gear 104 is partway between forward direction coupling pin 87 and rearward direction coupling pin 89 on delay coupler 81. This assures that commencing the reverse driving of the pick roller to expel partially picked pages does not occur until after the pressure plate has been moved into disengagement position.

Cam follower 86 is resting in a notch on cam 88 which is rigidly mounted for turning with pressure plate gear 90. So long as cam follower 86 remains in the notch, the pressure plate remains in closed engagement position. The connection between cam follower 86 and the pressure plate is best shown in FIG. 7. The cam follower 86 is mounted on the end of a pivot rod 92 which is mounted for pivotal rotation by a pair of brackets 94 and a counter-bracket 96. A pair of fingers 98 are also mounted on pivot rod 92 and interconnect with matching slots 99 so that when the pressure plate gear 90 is rotated in direction 100, the cam follower is forced to pivot upwardly into "disengagement position" and ride along the larger diameter surface 102. This makes the entire pivot rod 92 rotate and causes the fingers 90 to pivot the pressure plate in direction 103 into a completely retracted position of disengagement in a direction away from the pick roller 32. When the pressure plate 90 has made a complete rotation, the cam follower rides back down into the notch, thereby allowing the pressure plate to return to an "engagement position".

A linkage gear 104 is slidably mounted on the pick shaft 78 to couple the drive motor 40 to the pressure plate gear 90, and also to couple the drive motor 40 through the double-pin delay coupler 81 to the pick roller. When the motor drive gear 84 is in reverse, the linkage gear rotates in direction 105 to move its attached transfer gear 106 into link position with the pressure plate gear 86. Thus the coupling from drive motor 40 to the pressure plate gear 90 is through double-wheel gear 108, main drive gear 42, spur gears 110, 112, linkage gear 104, and transfer gear 106. Decoupling occurs when the motor drive gear 84 changes back to forward, since this changes the rotation direction of linkage gear 104 and moves transfer gear 106 in the direction 114 to a non-link position 116. The foregoing gear/cam mechanism provides for automatic movement of the pressure plate between a position of engagement of the stacks with the pick roller and a position of dis-engagement. This necessarily occurs after a page being processed at the scanning station or the printing station has passed by the main drive roller 42 and the output roller 43 to the common output area 44.

The initiation of the dis-engagement can be programmed to occur at predetermined times such as before every picking step, or whenever a mis-feed occurs, or the like. Also, when a document page is placed in the ADF, it pushes down sensor 118 to activate the aforementioned dis-engagement sequence of steps.

As best shown in FIG. 6, the delayed contact of the pin 85 on linkage gear 104 with double-pin delay coupler 81 causes the reversing of the pick roller expelling any pages from a previous picking step to occur after the pressure plate has moved to a position of dis-engagement.

As best shown in FIG. 6, the gearing mechanism is designed to automatically provide a delay between the picking of successive pages from the sheet stack or document stack. In that regard, the gearing ratios provide for output roller 43 to rotate faster than main drive roller 42 which rotates faster than pick roller 32. The speed differential between the output roller 43 and the main drive roller 42 keeps a page in tension as it passed through the printing station, the scanning station, or the combined printing/scanning station.

The linkage gear 104 has its single pin 85 which engages one or the other of the two pins 87, 89 on the delay coupler 81 (depending on the direction of the main drive) to drive the pick roller forwardly or rearwardly with a partial revolution delay for driving the pick roller when a directional change occurs. This relationship between the linkage gear 104 and the delay coupler 81, when combined with the speed differential between the pick roller 32 and the main drive roller 42, provides for the pin on the linkage gear 104 to walk away from engagement of the pin on the delay coupler so long as a page is in driving engagement with both the pick roller and the main drive roller. In other words, during that double driving period, the pick roller is slaved to the paper and rotates faster than the linkage gear to cause the aforesaid "walk away".

When the trailing edge of the page finally leaves the pick roller, the pick roller shaft and the delay coupler mounted thereon stop, and the time it takes for the pin on the linkage gear to rotate into engagement with the pin on the delay coupler is the "delay time" which occurs between the picking of successive pages from the stack.

Thus, the aforementioned features of the present invention provide for automated operation of a printing station, scanning station or the like from a single drive motor through a gear mechanism which provides spaced-apart picking of successive pages from an input feed stack. These aforementioned features also provide for the shared use of a paper path and mechanisms which are involved along the path by a multiple-function device which employs operations such as printing, scanning and the like in the same machine.

Figure 14:
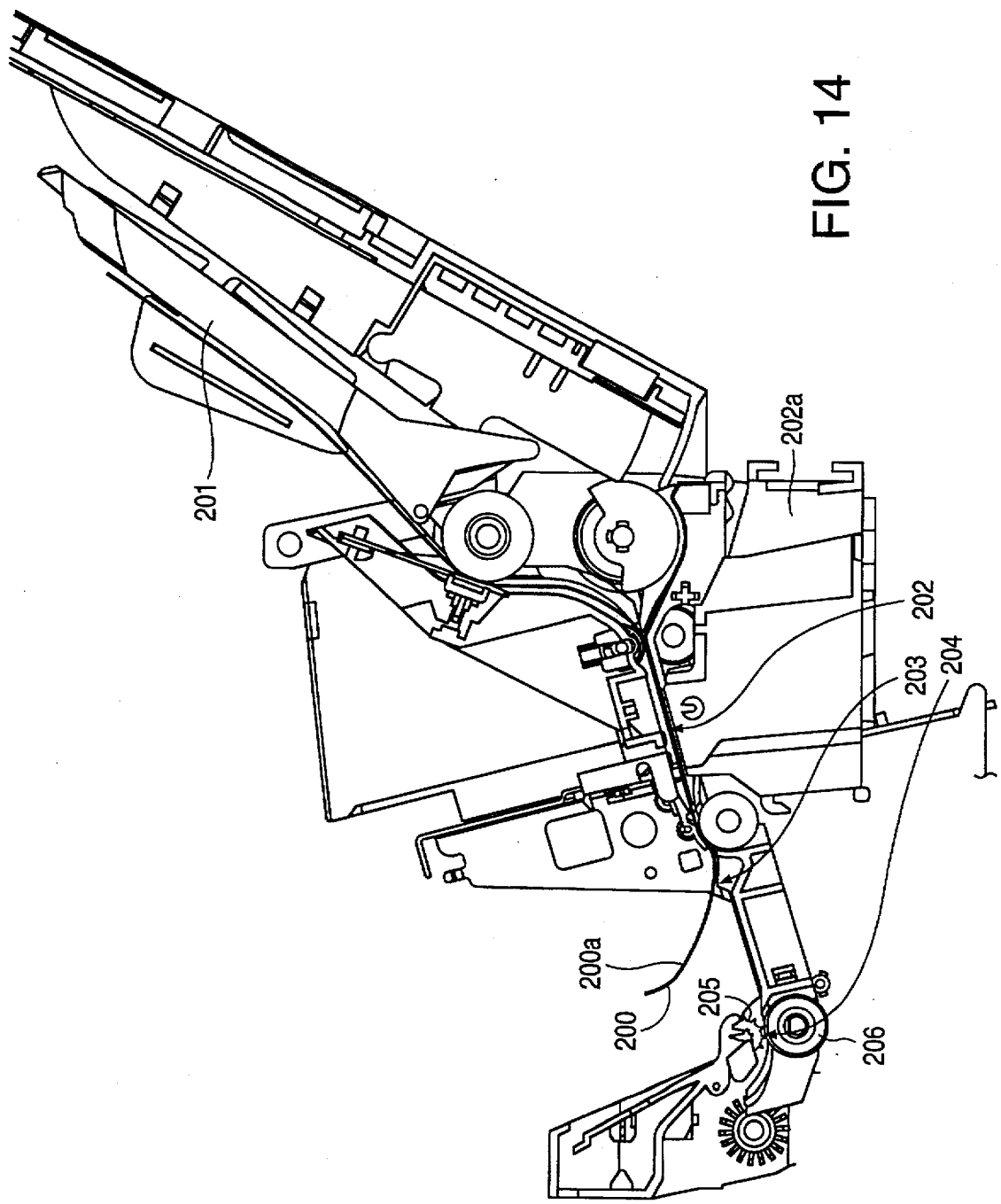
FIG. 14 is a more detailed schematic side view of the common paper path of the invention illustrating the common path with a curled document positioned immediately prior to an incipient paper jam at the output roller nip.

FIG. 14 illustrates the curling of a document 200 after the document has been fed from a document feeder 201 past a scanning station 202 where it has been scanned, passively over a printing station 203 (sans print cartridge which has slid away from the print zone) which document was destined to be conducted into a nip 204 between output rollers 205 and 206. As a curled document exits the scan station and enters the print region it is free to return to its natural curled state. Due to the curling of the document at 200a, the document is in an incipient position to cause a paper jam before reaching the nip 204.

Figure 15:
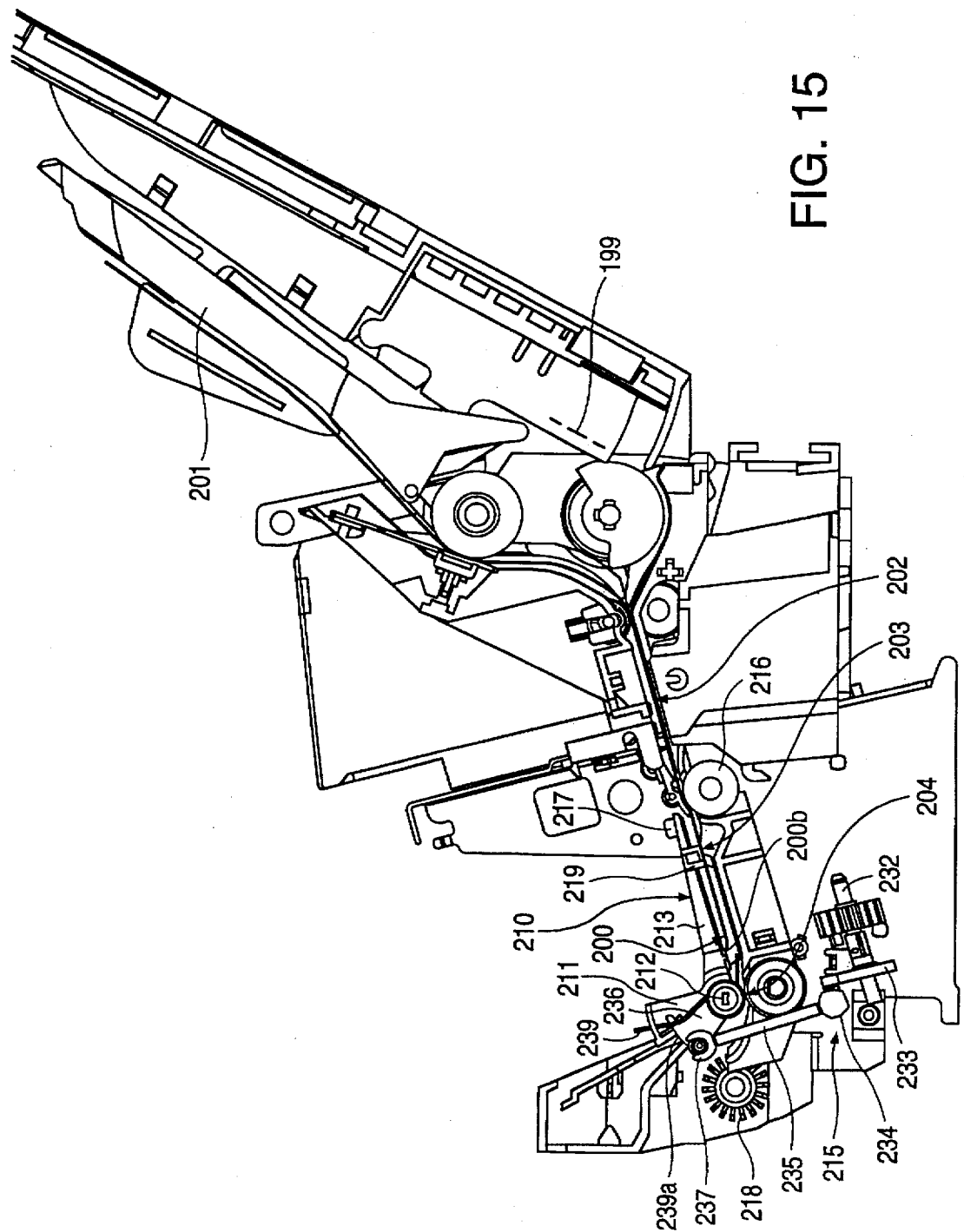
FIG. 15 is a schematic side view of the common paper path showing a jam-preventing document guide in a lowered position.

FIG. 15 shows the addition of a document guide 210 which in a lowered position deflects an incoming document 200 by being forced by roller 216 under the deflector guide. The leading edge of a curled or damaged or deformed document (or the uncurled leading edge if the document is flat) are deflected by a document guide essentially smoothed-faced underside surface 217 and thus guide the leading edge 200b of the document into the nip 204. A tab 219 depends from near a distal end of guide 210 and rides on an edge of the print platen 203a (FIG. 16) of the printing station and functions as a down stop of the document guide 210. The document guide has a first long portion 213 which in a scanning mode position is parallel to the platen of the printing station and in position to guide a document (curled or uncurled) into the nip 204, an integral short portion 211 and a pivot 212. Arrow 220 in FIG. 17 denotes the document feed direction. The documents are constrained at their top surface by the underside 217 of the document guide and at their bottom surface by the print station platen.

Sheets which are to be printed on are clean virgin sheets without curl and thus there is no need to guide or constrain the print sheets to the common output nip. Sensors (not shown) in the document tray 201 and in the sheet feed path 199 indicate if a document is to be scanned or a sheet is to be printed. Conical rollers 218 are provided as part of a wet paper stacker (shown in FIGS. 18–22) which functions to force the edges of the printed-on sheets to go up causing a sheet stiffness so that the sheet more accurately drops into a bin allowing for more dry time of the previous sheet.

Figure 16:
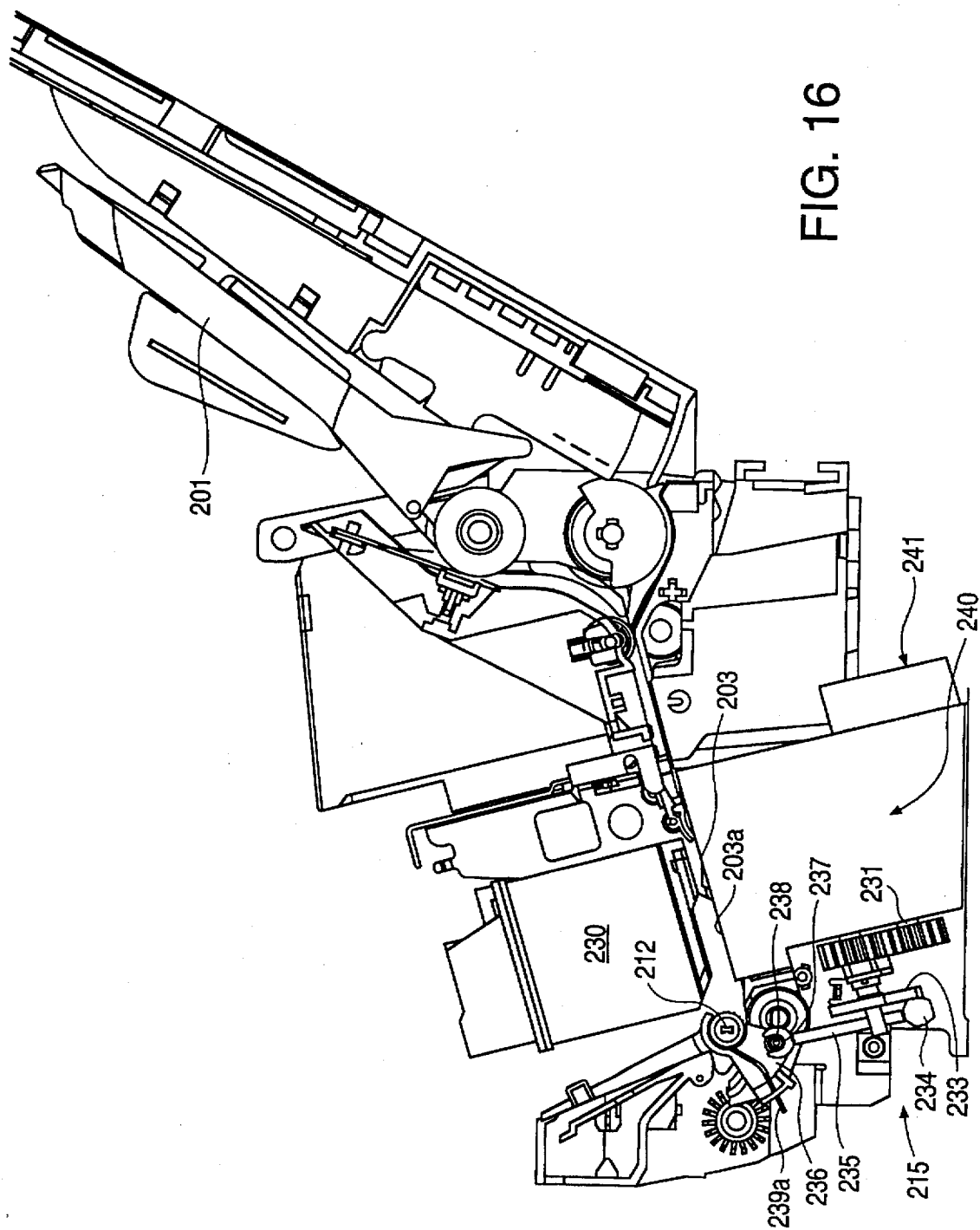
FIG. 16 is a schematic side view of the common paper path showing the document guide in a raised position allowing the print cartridge to be horizontally moved into a printing mode position.
Figure 17:
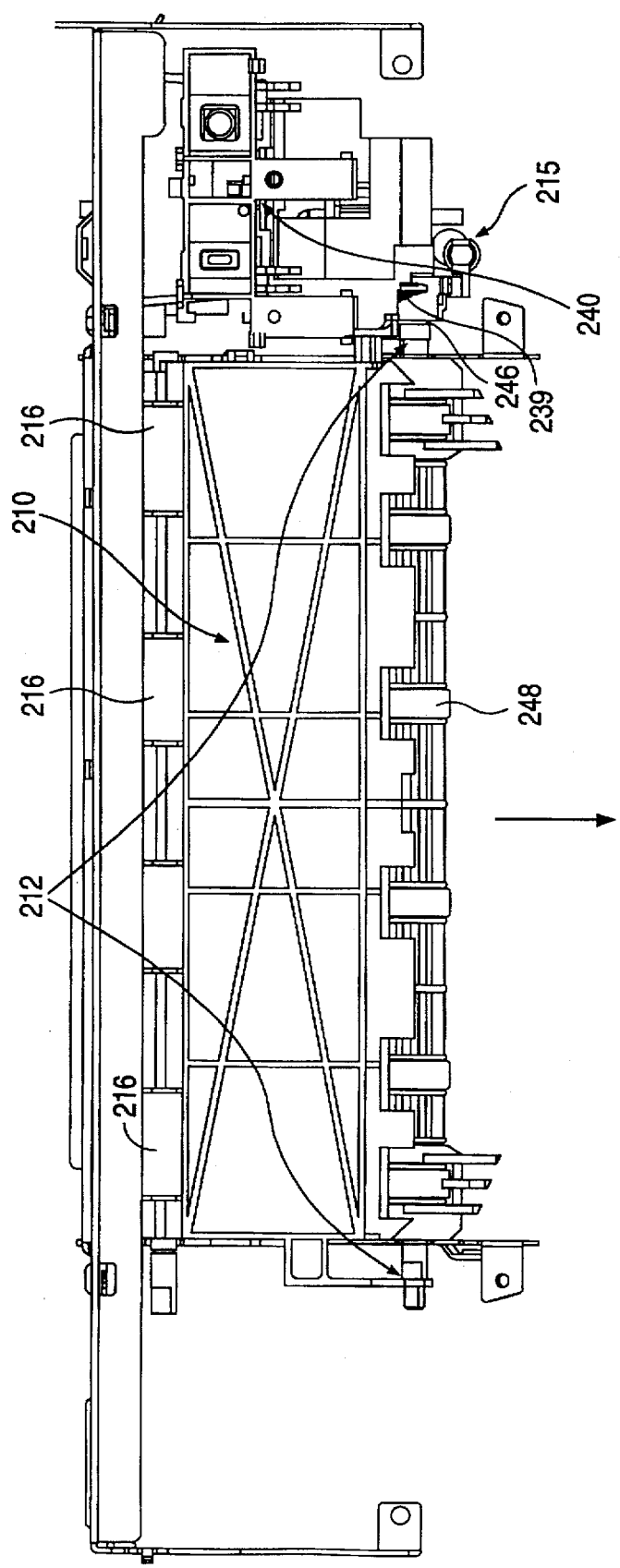
FIG. 17 is a top view of the printer station with the document guide in a scanning mode position.
Figure 22:
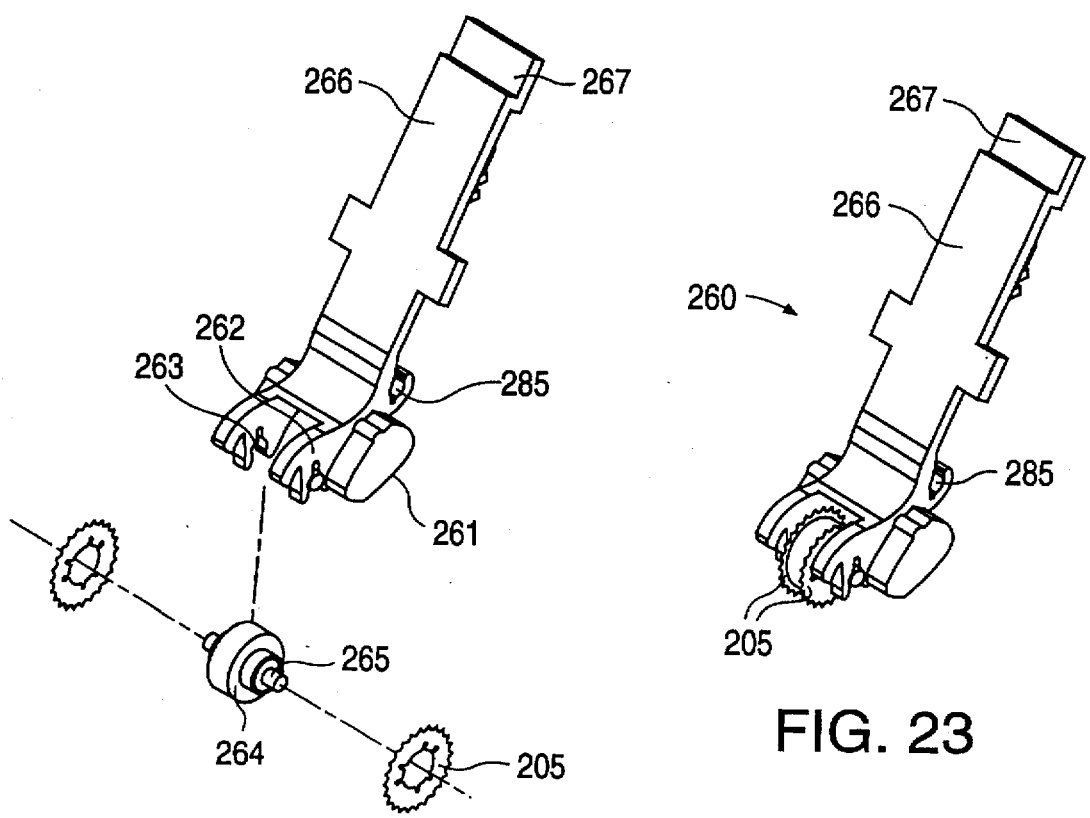
FIG. 22 is a exploded view of the guide ribs and star wheel carrier.

As seen in FIGS. 15, 16 and 22 a mechanism is provided to rotate and lower the document guide clockwise about 100° to 110° for a scanning mode of operation after a printing mode of operation has been completed, with the print cartridge slid away from the printing station or zone. Thereafter, a coil spring 239 having an end 239a attached to a pivot plate 236 and coiled around the pivot, which has been spring loaded by the rotary movement, returns, by the spring bias, the document guide 210 back to the raised position shown in FIG. 16. This is required to allow for the print cartridge 230 (FIG. 16) to be moved into close proximity to the paper sheet. The document guide is rotatively movable about the pivot 212 which provides a center of rotation. Actuation is provided by a linkage 215 between the document guide and the print cartridge capping and wiping system 240 (FIGS. 16 and 17). The invention makes use of a dwell state in the capping function where the capping and wiping system motor 241 continues to rotate after the print cartridge has been capped. This extra motion is connected to gear shaft 231 (FIG. 16) to the linkage 215 and is just long enough to raise the document guide when rotating the capping system motor in one direction or lower it when rotating in the other direction.

The linkage 215 includes a document guide drive shaft 232 which rotates a lever arm 233 containing an offset ball crank 234 from the position shown in FIG. 16 to the position shown in FIG. 15 by moving a push rod 235 having a fork end 237 pushing on a fixed pin 238 on a pivot plate 236, which end rotates the pivot plate 236 fixedly connected to the document guide 210 clockwise to pivot the document guide counterclockwise (looking at FIG. 16) to its raised position in FIG. 16, permitting the print cartridge 230 (FIG. 16) to be moved laterally into the print station 203.

Figure 18:
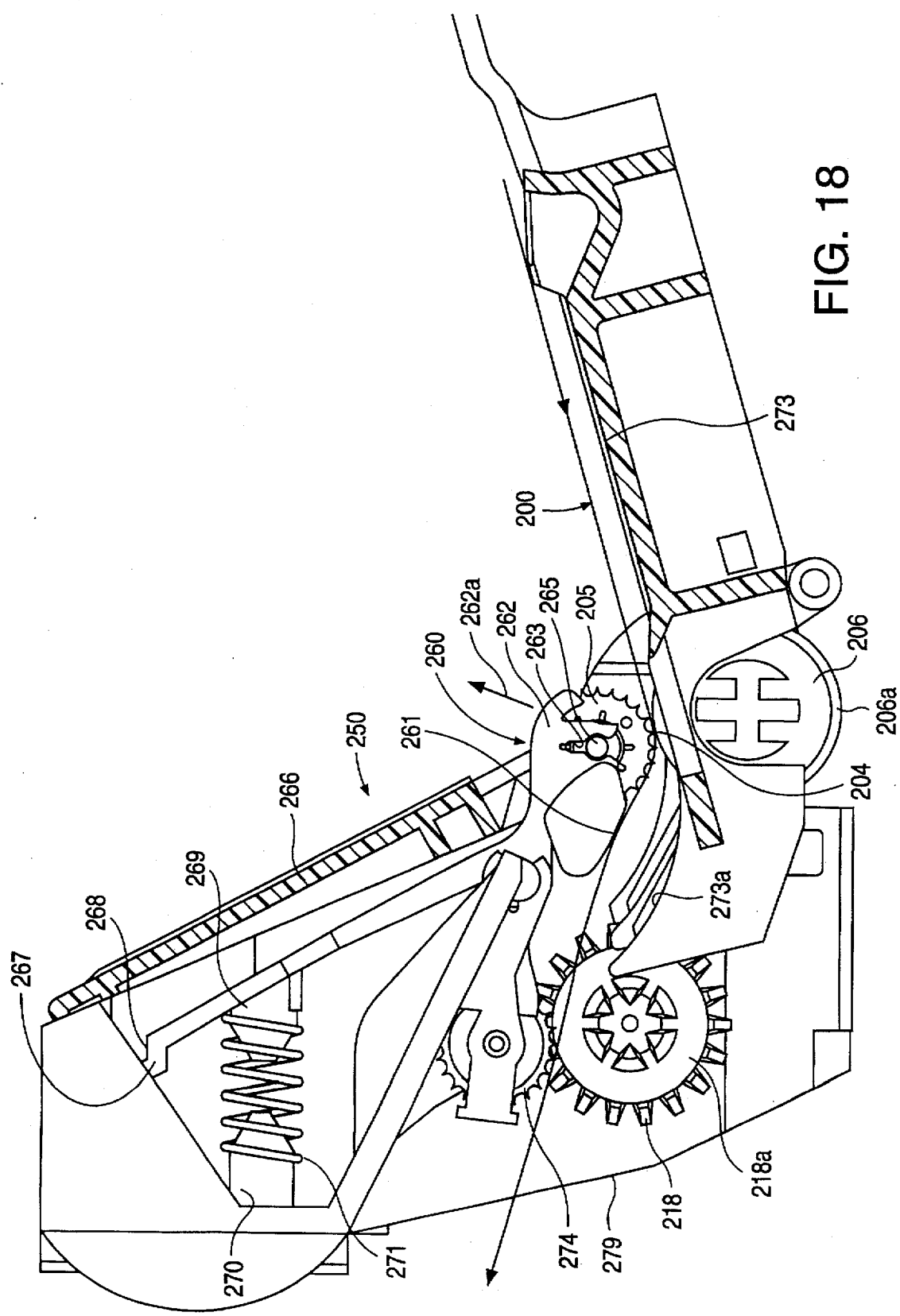
FIG. 18 is a cross-sectioned side view of the exit mechanism including a floating rib and beam.

FIG. 18 illustrates the exit mechanism 250 which is connected to a print mechanism chassis (not shown). A platen 273 is associated with the exit mechanism and forms a surface along which the printed media or document rides into the nip 204 between a roller 206 and star wheel 205 (also shown in FIG. 14). The platen also extends across the print mechanism chassis. An exit chassis 279 mounts a series of floating ribs 260 which are pivotably mounted on an integral shaft 277 (FIG. 19) extending across a like series of cut-outs 277a in a bottom edge 276 of the chassis 279. Each of the guide ribs 260 include a pair of guide surfaces 261 extending from a star wheel carrier 266 which includes an integral flat beam extending cantilevered transversely from chassis edge 276 upwardly to a distal end 267, which carrier is prevented against full rotation by a series of stops 268 integrally extending from a top opposite edge 278 (FIG. 19) of the chassis 279. A spring 271 extends from an integral boss 269 on the underside of beam 266 and an integral boss 270 extending from an interior wall of chassis 279 to provide a normal force on the star wheels 205 and against the printed media or document passing through the nip 204.

The drive force (kickout) which moves the document or paper through the nip and into the output tray is equal to the normal force being provided by spring 271 times the coefficient of friction of the tires 206a (FIG. 18) on the roller 206. The guide ribs 260 also contain an apical end 262 having snap-in slots 263 into which opposite ends of a hub shaft 265 mounting a pair of freely rotatable star wheels 205 are snap-mounted. The distal legs forming the slot have sufficient flexibility to allow the ends of shaft to be held firmly, with a spaced pair of star wheels freely rotating about the shaft. A circular hub 264 (FIG. 22) spaces the star wheels. When a printed media 200, typically a paper sheet, is passed through the nip 204, the sheet passes along guide rib surfaces 261 after passing the series of star wheels so as to pass across the conical surfaces 218a of the conical rollers 218 to raise the wet paper edges as mentioned above, and to pass the sheet into an output tray (not shown).

In order to utilize the same parts in each of the star wheel assemblies the guide ribs 260 are provided on all six star wheel assemblies as shown. In fact however, only the outer two star wheel ribs 260 i.e., one on each end of the chassis 279, namely assemblies 260a and 260b (FIG. 20) are functional since, when the front adjacing edge of the printed media or document goes up the ramps 273a integrally extending from the platen 273 and up on the conical rollers 218 (kicktires) to a radius on the print media or document outer edges, the rib surfaces 261 of the outer assemblies 260a and 260b are the only rib surfaces which contact the side edges of the printed media or document.

When a thick document (or a thick printed media) passes over the platen 273 into the nip 204, the guide ribs (and carrier with attached series of star wheels) rotates or floats the apical end 262 upwardly, as shown by arrow 262a, moving integral beam 266 off the stop 268 on the chassis, and compressing spring 271. When the thick document (or a thick printed media) completes its passage through the nip 204 the guide ribs assembly 260 will rotate back adjacent to the stop 268 by expansion of the compressed spring 271 and guide surfaces 261 are returned to the normal printed media (paper) passage position.

Figure 19:
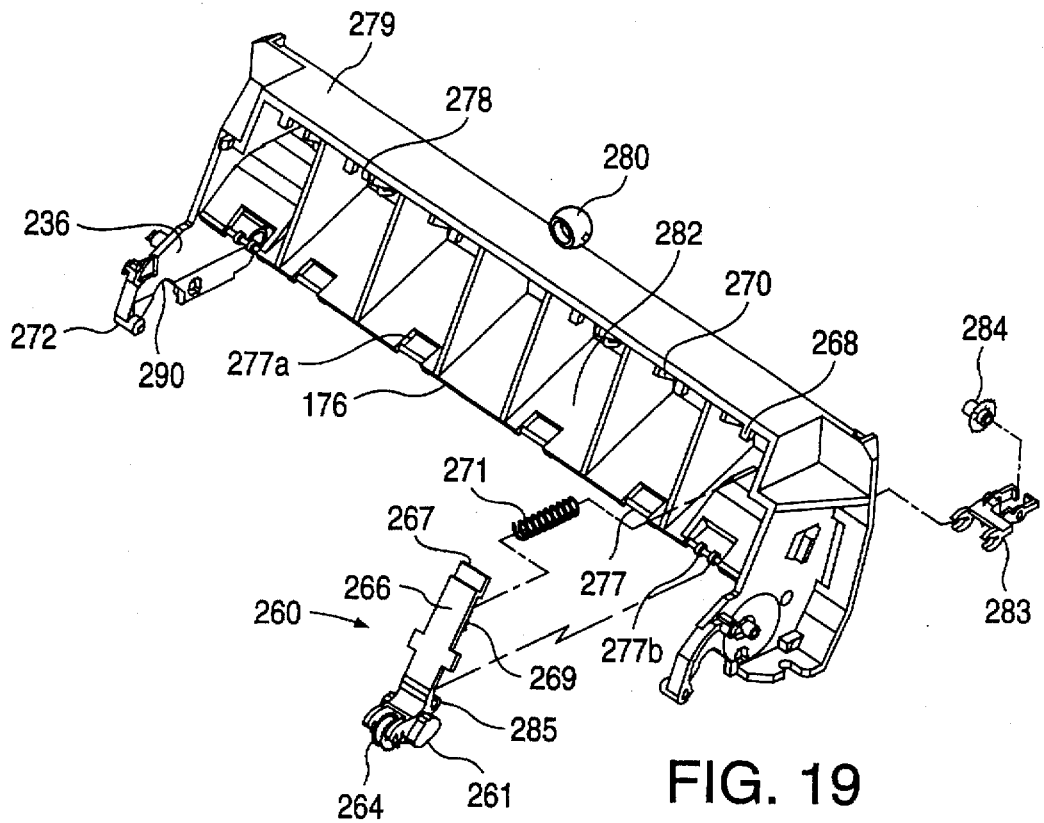
FIG. 19 is an exploded view of the exit chassis with floating guide rib including a star wheel carrier.

FIG. 19 illustrates the assembly of the guide ribs 260 into the cut-outs 277a with spring 271 extending from boss 270 to boss 269. The beams 266 include snap-in portions 285 which snap-onto the shafts 277 extending across the cut-outs. A kickstar holder 283 is pressed into chassis 279. A kickstar hub 284 mounts a star wheel 274 (FIG. 18) extending from the holder 283. The star wheel 274 presses or pinches the document or printed media (paper) against the conical wheels 218. The exit force is equal to the normal force provided by the weight of the brass hub times the coefficient of friction of the wheels against the paper which drives the back edge of the document or wet media to exit toward the output tray once it leaves the nip 204.

A knob 280 extends from chassis 279 to provide an engagement member to snap-in a printer enclosure or cover (not shown). Chassis arms 272 attach to the print mechanism chassis (not shown). A curved section 290 of the arms 272 functions to provide a clearance for bushings which retain the print wheel roller 206 on the print mechanism chassis.

Figure 20:
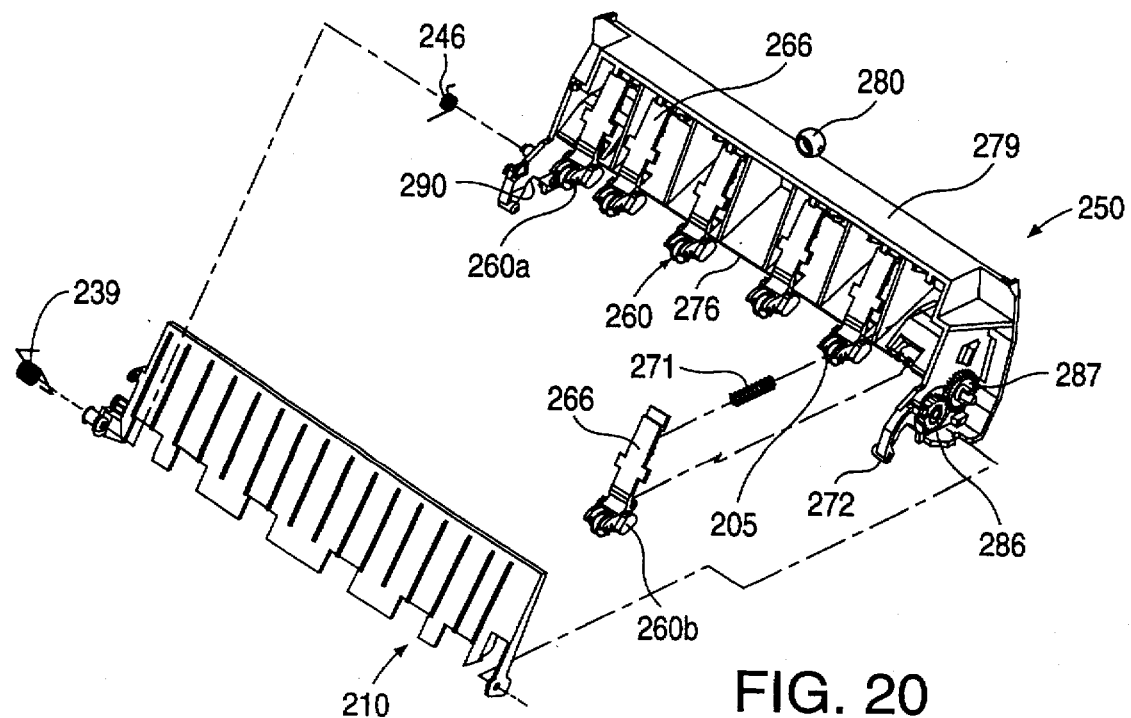
FIG. 20 is an exploded view of the document deflector of FIG. 17 and showing a series of floating ribs and star wheels assembled in the exit chassis.

FIG. 20 shows the assembly of the document deflector 210 (FIG. 17) to the chassis 279. Gears 286 and 287 are driven by a paper path motor (not shown) to rotate the conical wheels 218. Four centrally spaced guide ribs 260 are shown with outer guide ribs at each end of the chassis. An additional star wheel 274 (FIG. 18) is mounted on a longer shaft 277b by U-shaped arms extending from a shaft freely mounting a single star wheel (FIG. 18) downstream of the conical roller to ensure that the back trailing edge of the printed media or document is driven out into the output tray.

Figure 21:
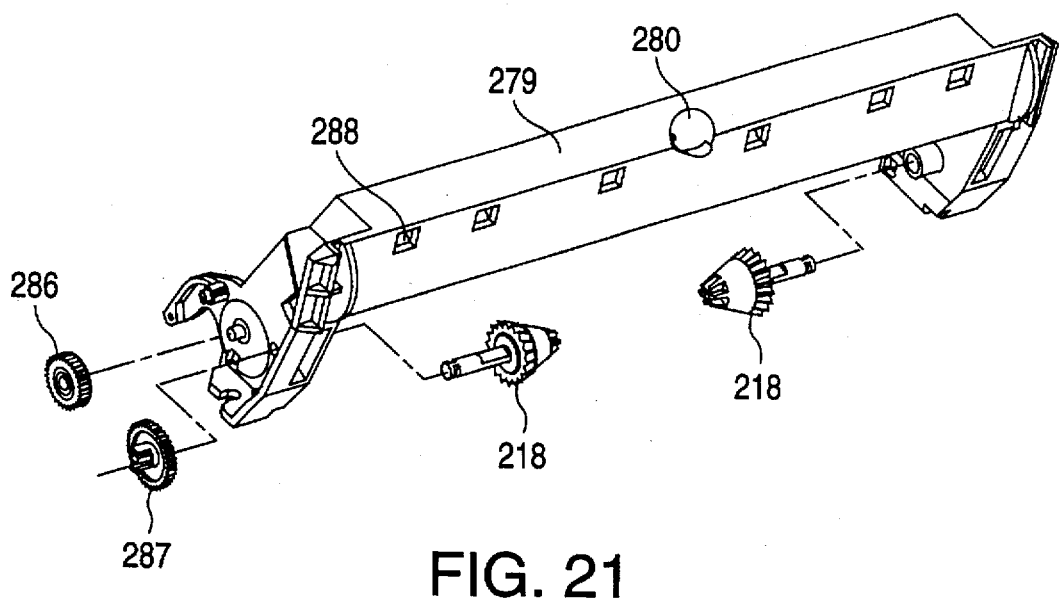
FIG. 21 is an exploded view of the rear of the exit chassis and conical wheels downstream from the floating ribs and star wheels.

FIG. 21 illustrates the mounting of conical rollers 218 and gears 286 and 287 into the chassis 279 by snap rings (not shown). Cut-outs 288 function to aid in the injection molding of the exit chassis 279.

FIG. 22 shows a guide rib and star wheel carrier particularly the snap-in slots 285 for the mounting of the carrier onto shafts 277 and 277b.

Figure 23:
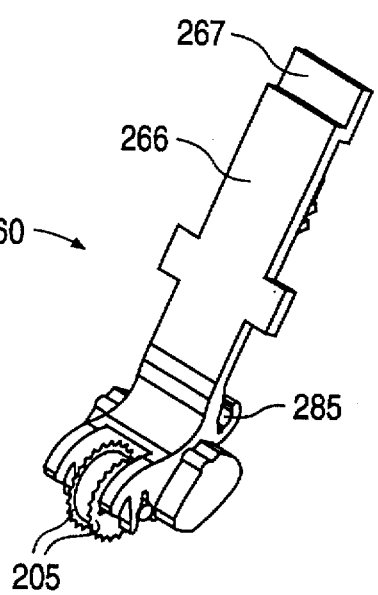
FIG. 23 is a perspective view of the assembled star wheel carrier and guide ribs.

FIG. 23 shows the assembled star wheel hub and star wheel carrier guide rib used particularly at the ends of the edge 276 of chassis 279.

Figure 24:
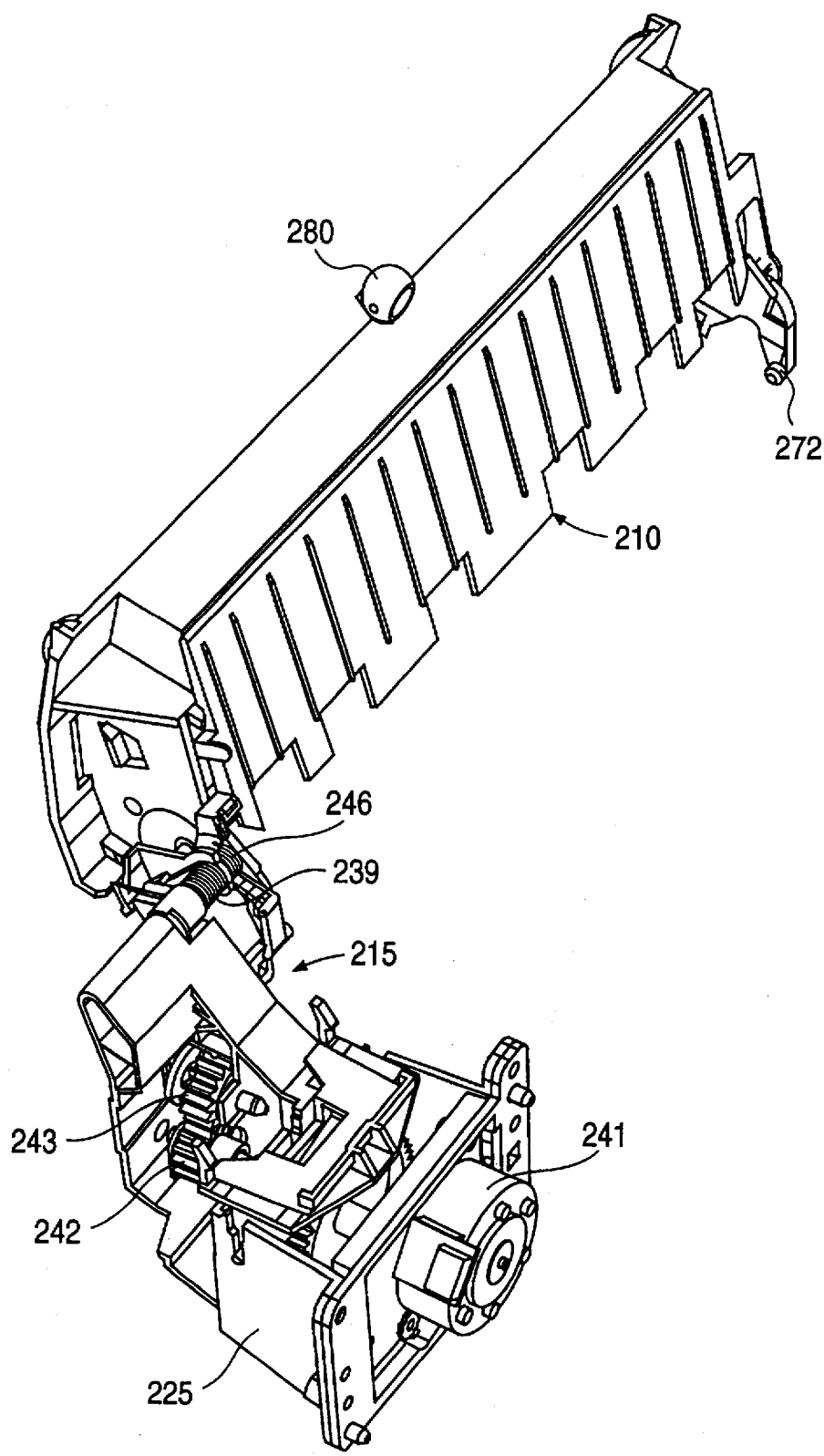
FIG. 24 is a perspective view of the underside of the exit chassis with an attached document deflector and its drive mechanism.

FIG. 24 which is drawing sheet (FIG. 20) from the second mentioned related application illustrating the mechanism for rotating the document deflector 215 used to ensure non-jamming of a curled document entering the nip 204. Particularly it illustrates the deflector (flapper) up spring 239 and down spring 246, also shown in FIG. 20 hereof, as well as part of the deflector drive, including motor 241, housing 225 and drive gears 242 and 243.

While specific illustrated embodiments have been shown and described, it will be appreciated by those skilled in the art that various modifications, changes and additions can be made to the methods, structures and apparatus of the invention without departing from the spirit and scope of the invention as set forth in the following claims.

We claim:

1. An exit mechanism for printed media and documents exiting from a print station of a printer comprising:

an exit chassis, said chassis including a longitudinal first edge;

a series of spaced guide ribs including an integral beam pivotably mounted adjacent to said first edge; and spring members extending between said chassis and said beams for providing a normal force on said guide ribs and on the printed media and documents, whereby printed media of one thickness and printed media or documents of a greater thickness conveyed past said beams are accommodated by pivoted movement of said beams compressing said spring members, with respect to the printed media or documents of the greater thickness.

2. The mechanism of claim 1 wherein said chassis includes a series of cut-outs in said first edge, each cut-out including an integral shaft extending across said first edge, each of said guide ribs including an integral snap-in for rotatively mounting said guide ribs on respective ones of said shafts.

3. The mechanism of claim 1 wherein each of said guide ribs include a spaced pair of guide surfaces.

4. The mechanism of claim 3 further including at least one star wheel mounted between said guide surfaces and freely rotatable with respect to said guide surfaces.

5. The mechanism of claim 4 wherein the guide surfaces and star wheels are simultaneously pivoted by the printed media or document of the greater thickness.

6. The mechanism of claim 1 further including a pair of conical wheels rotatively attached to said chassis, said conical wheels being adapted to curve side edges of a printed media, when the printed media is exiting from said guide ribs.

7. The mechanism of claim 1 further including a series of stops on the exit chassis to prevent full rotation of respective ones of said integral beams, wherein said stops extend integrally from an edge of said chassis opposite said guide ribs and wherein said spring members are coil springs extending from an underside of said beams and an interior surface of said chassis.

8. The mechanism of claim 1 wherein each said guide rib include a pair of guide surfaces and a pair of snap-in slots extending rearwardly from said guide surfaces and further including a rotatable star wheel assembly inserted into each of said snap-in slots.

9. The mechanism of claim 1 further including a snap-in groove on said beam and at least one star wheel having a shaft snap-inserted into said groove.

10. In combination, a common printer platen for conveying printed media and documents to a printer exit including a roller and a guide ribs assembly comprising a beam, a series of spaced guide ribs and at least one star wheel forming a nip with the roller; and wherein said assembly including said beam, said guide ribs and said at least one star wheel are pivotable relative to said roller to accommodate printed media or documents of a first range of thickness and printed media or documents of a second range of greater thickness passing through the nip.

11. The combination of claim 10 wherein said guide ribs assembly is pivotally mounted on an exit chassis.

12. In combination, a common printer platen for conveying printed media and documents to a printer exit including a roller and a series of spaced guide ribs forming a nip with the roller:

wherein said guide ribs are pivotable relative to said roller to accommodate printed media or documents of a first range of thickness and printed media or documents of a second range of greater thickness passing through the nip;

wherein said guide ribs are pivotally mounted on an exit chassis; and wherein said guide ribs each include an integral beam cantilevered transversely across said exit chassis, and wherein said exit chassis includes a series of stops extending from said exit chassis toward said guide ribs, said beams being limited in rotation by respective ones of said stops and being movable was from said stops by movement of the printed media or a document of the greater thickness past said guide ribs.

13. The combination of claim 12 further comprising a series of coil springs extending from an underside of said beams and an interior surface of said exit chassis for providing a normal force on said beams, said guide ribs and said printed media or document.

14. The combination of claim 13 wherein each said guide rib include a pair of guide surfaces and a pair of snap-in slots extending rearwardly from said guide surfaces and further including a rotatable star wheel assembly inserted into each of said snap-in slots.

15. In combination, a common printer platen for conveying printed media and documents to a printer exit including a roller and a series of spaced guide ribs forming a nip with the roller:

wherein said guide ribs are pivotable relative to said roller to accommodate printed media or documents of a first range of thickness and printed media or documents of a second range of greater thickness passing through the nip;

wherein said guide ribs are pivotally mounted on an exit chassis; and further including a pair of conical wheels rotatively connected to said exit chassis for conveying the printed media to the printer exit.

* * * * *